(12) United States Patent
Kirovski et al.

(10) Patent No.: US 7,266,697 B2
(45) Date of Patent: Sep. 4, 2007

(54) STEALTHY AUDIO WATERMARKING

(75) Inventors: Darko Kirovski, Redmond, WA (US); Henrique Malvar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 10/838,497

(22) Filed: May 3, 2004

(65) Prior Publication Data

US 2004/0204943 A1 Oct. 14, 2004

Related U.S. Application Data

(62) Division of application No. 09/614,660, filed on Jul. 12, 2000, now Pat. No. 7,020,285.

(60) Provisional application No. 60/143,432, filed on Jul. 13, 1999.

(51) Int. Cl.
*H04L 9/00* (2006.01)
*H04K 1/00* (2006.01)

(52) U.S. Cl. .................. 713/176; 380/201; 382/191

(58) Field of Classification Search ............... None
See application file for complete search history.

(56) References Cited

U.S. PATENT DOCUMENTS

| | | |
|---|---|---|
| 5,646,997 A | 7/1997 | Barton |
| 5,687,236 A | 11/1997 | Moskowitz et al. |
| 5,745,604 A | 4/1998 | Rhoads et al. |

(Continued)

FOREIGN PATENT DOCUMENTS

| | | |
|---|---|---|
| EP | 0 581 317 | 2/1994 |
| EP | 0 770 498 | 5/1997 |
| EP | 0 840 513 | 5/1998 |

(Continued)

OTHER PUBLICATIONS

Cox et al, "Secure Spread Spectrum Watermarking for Multimedia", 1997, IEEE Transactions on Image Processing, vol. 6, No. 12, p. 1673-1687.*

(Continued)

*Primary Examiner*—Christopher Revak
(74) *Attorney, Agent, or Firm*—Lee & Hayes, PLLC

(57) ABSTRACT

Described herein is audio watermarking technology for inserting and detecting watermarks in audio signals, such as a music clip. The watermark identifies the content producer, providing a signature that is embedded in the audio signal and cannot be removed. The watermark is designed to survive all typical kinds of processing and malicious attacks. In one described implementation, a watermarking system employs chess spread-spectrum sequences (i.e., "chess watermarks") to improve the balance of positive and negative chips in the watermarking sequences. The balance is not imposed in an orderly fashion, which might make the watermark sequence more easily detectable to an attacker, but in a pseudo-random fashion. In that way, better sequence balance is achieved while preserving its randomness for an attacker without knowledge of the keys. In another described implementation, a watermarking system employs an energy-level trigger to determine whether to skip encoding of a portion of a watermark within a given time span of an audio clip. If a large discrepancy in energy levels exists over a given time frame, then the frame is not watermarked, to avoid audible time-dispersion of artifacts due to spectral modifications (which are similar to "pre-echo" effects in audio coding). In another described implementation, a watermarking system begins encoding of a watermark at a variable position after the beginning of an audio clip.

7 Claims, 13 Drawing Sheets

U.S. PATENT DOCUMENTS

| | | |
|---|---|---|
| 5,809,139 A | 9/1998 | Girod et al. |
| 5,822,360 A | 10/1998 | Lee et al. |
| 5,822,432 A | 10/1998 | Moskowitz et al. |
| 5,889,868 A | 3/1999 | Moskowitz et al. |
| 5,905,800 A | 5/1999 | Moskowitz et al. |
| 5,917,914 A | 6/1999 | Shaw et al. |
| 5,930,369 A * | 7/1999 | Cox et al. .................... 380/54 |
| 5,933,798 A | 8/1999 | Linnartz |
| 5,991,426 A | 11/1999 | Cox et al. |
| 6,024,287 A | 2/2000 | Takai et al. |
| 6,029,126 A | 2/2000 | Malvar |
| 6,031,914 A | 2/2000 | Tewfik et al. |
| 6,064,738 A | 5/2000 | Fridrich |
| 6,064,764 A | 5/2000 | Bhaskaran et al. |
| 6,094,483 A | 7/2000 | Fridrich et al. |
| 6,128,736 A | 10/2000 | Miller |
| 6,131,162 A | 10/2000 | Yoshivra et al. |
| 6,192,139 B1 | 2/2001 | Tao |
| 6,208,735 B1 * | 3/2001 | Cox et al. .................... 380/54 |
| 6,208,745 B1 | 3/2001 | Florencio et al. |
| 6,209,094 B1 | 3/2001 | Levine et al. |
| 6,219,634 B1 | 4/2001 | Levine |
| 6,256,736 B1 | 7/2001 | Coppersmith et al. |
| 6,259,801 B1 | 7/2001 | Wakasu |
| 6,275,599 B1 | 8/2001 | Adler et al. |
| 6,282,300 B1 | 8/2001 | Bloom et al. |
| 6,330,672 B1 | 12/2001 | Shur |
| 6,332,031 B1 | 12/2001 | Rhoads et al. |
| 6,332,194 B1 | 12/2001 | Bloom et al. |
| 6,334,187 B1 | 12/2001 | Kadono |
| 6,408,082 B1 | 6/2002 | Rhoads et al. |
| 6,449,378 B1 | 9/2002 | Yoshida et al. |
| 6,487,574 B1 | 11/2002 | Malvar |
| 6,504,941 B2 | 1/2003 | Wong |
| 6,523,113 B1 | 2/2003 | Wehrenberg |
| 6,553,127 B1 | 4/2003 | Kurowski |
| 6,585,341 B1 * | 7/2003 | Walker et al. ................. 347/14 |
| 6,591,365 B1 | 7/2003 | Cookson |
| 6,608,867 B2 * | 8/2003 | Zhong et al. ............ 375/240.2 |
| 6,614,914 B1 | 9/2003 | Rhoads et al. |
| 6,700,989 B1 * | 3/2004 | Itoh et al. ................... 382/100 |
| 6,778,678 B1 | 8/2004 | Podilchuk et al. |
| 6,807,634 B1 | 10/2004 | Braudaway et al. |
| 6,952,774 B1 | 10/2005 | Kirovski et al. |
| 6,961,444 B2 * | 11/2005 | Levy .......................... 382/100 |
| 7,123,744 B2 * | 10/2006 | Muratani et al. ........... 382/100 |
| 7,142,691 B2 * | 11/2006 | Levy .......................... 382/100 |
| 7,197,164 B2 * | 3/2007 | Levy .......................... 382/100 |
| 2001/0000701 A1 | 5/2001 | Cameheim et al. |
| 2002/0009208 A1 | 1/2002 | Alattar et al. |

FOREIGN PATENT DOCUMENTS

| | | |
|---|---|---|
| EP | 0 899 948 | 3/1999 |
| EP | 0 913 952 | 5/1999 |
| EP | 1 017 049 | 12/1999 |
| JP | 11110913 | 4/1999 |
| WO | WO98/03014 | 1/1998 |
| WO | WO99/11020 | 3/1999 |

OTHER PUBLICATIONS

Cookson, Christopher J., U.S. Appl. No. 60/116,641, filed Jan. 21, 1999, pp. 1-6.

Kirovski et al."Robust Spread-Spectrum Audio Watermarking" 2001 IEEE p. 1345-1348.

Fridrich "Image Watermarking for Tamper Detection" 1998 citeseer.ist.psu.edu/fridrich98image.html 5 pages.

Kankanhalli et al."Content Based Watermarking of Images" 1998 ACM Multimedia '98 p. 61-70.

Swanson et al., "Robust Audio Watermarking Using Perceptual Masking", Signal Processing 66, 1998, pp. 337-355.

Zhou et al., "A Generic Digital Watermarking Model", Comput. & Graphics, vol. 22, No. 4, 1998, pp. 397-403.

Mintzer, F; G. W. Braudaway. "If One Watermark is good, are more better?" Acoustics, Speech, and Signal Processing, 1999. Proceedings., 1999 IEEE International Conference on. Mar. 19, 1999, 2067-2069.

* cited by examiner

470

472

474

476

STEALTHY AUDIO WATERMARKING

CROSS-REFERENCE TO RELATED APPLICATIONS

This application claims priority from U.S. Provisional Patent Application Ser. No. 60/143,432 entitled "Improved Audio Watermarking" filed on Jul. 13, 1999.

RELATED APPLICATIONS

This is a divisional of U.S. patent application Ser. No. 09/614,660, filed Jul. 12, 2000 now U.S. Pat. No. 7,020,285.

TECHNICAL FIELD

This invention relates to protecting audio content by using watermarks. More particularly, this invention relates to a set of techniques that improve encoding and decoding of audio watermarks.

BACKGROUND

Since the earliest days of human civilization, music has existed at the crossroads of creativity and technology. The urge to organize sound has been a constant part of human nature, while the tools to make and capture the resulting music have evolved in parallel with human mastery of science.

Throughout the history of audio recordings, the ability to store and transmit audio (such as music) has quickly evolved since the early days just 130 years ago. From Edison's foil cylinders to contemporary technologies (such as DVD-Audio, MP3, and the Internet), the constant evolution of prerecorded audio delivery has presented both opportunity and challenge.

Music is the world's universal form of communication, touching every person of every culture on the globe. Behind the music is a growing multi-billion dollar per year industry. This industry, however, is constantly plagued by lost revenues due to music piracy.

Protecting Rights

Piracy is not a new problem. However, as technologies change and improve, there are new challenges to protecting music content from illicit copying and theft. For instance, more producers are beginning to use the Internet to distribute music content. In this form of distribution, the content merely exists as a bit stream which, if left unprotected, can be easily copied and reproduced.

At the end of 1997, the International Federation of the Phonographic Industry (IFPI), the British Phonographic Industry, and the Recording Industry Association of America (RIAA) engaged in a project to survey the extent of lo unauthorized use of music on the Internet. The initial search indicated that at any one time there could be up to 80,000 infringing MP3 files on the Internet. The actual number of servers on the Internet hosting infringing files was estimated to 2,000 with locations in over 30 countries around the world.

Each day, the wall impeding the reproduction and distribution of infringing digital audio clips (e.g., music files) gets shorter and weaker. "Napster" is an example of an application that is weakening the wall of protection. It gives individuals access to one another's MP3 files by creating a unique file-sharing system via the Internet. Thus, it encourages illegal distribution of copies of copyrighted material.

As a result, these modern digital pirates effectively rob artists and authors of music recordings of their lawful compensation. Unless technology provides for those who create music to be compensated for it, both the creative community and the musical culture at large will be impoverished.

Identifying a Copyrighted Work

Unlike tape cassettes and CDs, a digital music file has no jewel case, label, sticker, or the like on which to place the copyright notification and the identification of the author. A digital music file is a set of binary data without a detectible and unmodifiable label.

Thus, musical artists and authors are unable to inform the public that a work is protected by adhering a copyright notice to the digital music file. Furthermore, such artists and authors are unable to inform the public of any addition information, such as the identity of the copyright holder or terms of a limited license.

Digital Tags

The music industry and trade groups were especially concerned by digital recording because there is no generation loss in digital transfers—a copy sounds the same as the original. Without limits on unauthorized copying, a digital audio recording format could easily encourage the pirating of master-quality recordings.

One solution is to amend an associated digital "tag" with each audio file that identified the copyright holder. To implement such a plan, all devices capable of such digital reproduction must faithfully reproduce the amended, associated tag.

With the passage of the Audio Home Recording Act of 1992, inclusion of serial copying technology became law in the United States. This legislation mandated the inclusion of serial copying technology, such as SCMS (Serial Copy Management System), in consumer digital recorders. SCMS recognizes a "copyright flag" encoded on a prerecorded original (such as a CD), and writes that flag into the subcode of digital copies (such as a transfer from a CD to a DAT tape). The presence of the flag prevents an SCMS-equipped recorder from digitally copying the copy, thus breaking the chain of perfect digital cloning.

However, subsequent developments—both technical and legal—have demonstrated the limited benefits of this legislation. While digital secure music delivery systems (such as SCMS) are designed to support the rights of content owners in the digital domain, the problem of analog copying requires a different approach. In the digital domain, information about the copy status of a given piece of music may be carried in the subcode, which is separate information that travels along with the audio data. In the analog domain, there is no subcode; the only place to put the extra information is to hide it within the audio signal itself.

Digital Watermarks

Techniques for identifying copyright information of digital audio content that address both analog and digital copying instances have received a great deal of attention in both the industrial community and the academic environment. One of the most promising "digital labeling" techniques is augmentation of a digital watermark into the audio signal itself by altering the signal's frequency spectrum such that the perceptual characteristics of the original recording are preserved.

In general, a "digital watermark" is a pattern of bits inserted into a digital image, audio, or video file that identifies the file's copyright information (author, rights, etc.). The name comes from the faintly visible watermarks imprinted on stationery that identify the manufacturer of the stationery. The purpose of digital watermarks is to provide copyright protection for intellectual property that is in digital format.

Unlike printed watermarks, which are intended to be somewhat visible, digital watermarks are designed to be completely invisible, or in the case of audio clips, inaudible. Moreover, the actual bits representing the watermark must be scattered throughout the file in such a way that they cannot be identified and manipulated. And finally, the digital watermark must be robust enough so that it can withstand normal changes to the file, such as reductions from lossy compression algorithms.

Satisfying all these requirements is no easy feat, but there are several competing technologies. All of them work by making the watermark appear as noise—that is, random data that exists in most digital files anyway. To view a watermark, you need a special program or device (i.e., a "detector") that knows how to extract the watermark data.

Herein, such a digital watermark may be simply called a "watermark." Generically, it may be called an "information pattern of discrete values." The audio signal (or clip) in which a watermark is encoded is effectively "noise" in relation to the watermark.

Watermarking

Watermarking gives content owners a way to self-identify each track of music, thus providing proof of ownership and a way to track public performances of music for purposes of royalty distribution. It may also convey instructions, which can be used by a recording or playback device, to determine whether and how the music may be distributed. Because that data can be read even after the music has been converted from digital to an analog signal, watermarking can be a powerful tool to defeat analog circumvention of copy protection.

The general concept of watermarking has been around for at least 30 years. It was used by companies (such as Muzak™) to audibly identify music delivered through their systems. Today, however, the emphasis in watermarking is on inaudible approaches. By varying signals embedded in analog audio programs, it is possible to create patterns that may be recognized by consumer electronics devices or audio circuitry in computers.

For general use in the record industry today, watermarking must be completely inaudible under all conditions. This guarantees the artistic integrity of the music. Moreover, it must be robust enough to survive all forms of attacks. To be effective, watermarks must endure processing, format conversion, and encode/detect cycles that today's music may encounter in a distribution environment that includes radio, the Web, music cassettes, and other non-linear media. In addition, it must endure malevolent attacks by digital pirates.

Watermark Encoding

Typically, existing techniques for encoding a watermark within discrete audio signals facilitate the insensitivity of the human auditory system (HAS) to certain audio phenomena. It has been demonstrated that, in the temporal domain, the HAS is insensitive to small signal level changes and peaks in the pre-echo and the decaying echo spectrum.

The techniques developed to facilitate the first phenomenon are typically not resilient to de-synch attacks. Due to the difficulty of the echo cancellation problem, techniques that employ multiple decaying echoes to place a peak in the signal's cepstrum can hardly be attacked in real-time, but fairly easy using an off-line exhaustive search. (The term "cepstrum" is the accepted terminology for the inverse Fourier transform of the logarithm of the power spectrum of a signal.)

Watermarking techniques that embed secret data in the frequency domain of a signal facilitate the insensitivity of the HAS to small magnitude and phase changes. In both cases, a publisher's secret key is encoded as a pseudo-random sequence that is used to guide the modification of each magnitude or phase component of the frequency domain. The modifications are performed either directly or shaped according to the signal's envelope.

In addition, watermarking schemes have been developed which facilitate the advantages but also suffers from the disadvantages of hiding data in both the time and frequency domain. It has not been demonstrated whether spread-spectrum watermarking schemes would survive combinations of common attacks: de-synchronization in both the temporal and frequency domain and mosaic-like attacks.

Watermark Detection

The copy detection process is performed by synchronously correlating the suspected audio clip with the watermark of the content publisher. A common pitfall for all watermarking systems that facilitate this type of data hiding is intolerance to desynchronization attacks (e.g., sample cropping, insertion, repetition, variable pitch-scale and time-scale modifications, audio restoration, and arbitrary combinations of these attacks) and deficiency of adequate techniques to address this problem during the detection process.

Desiderata of Watermarking Technology

Watermarking technology has several highly desirable goals (i.e., desiderata) to facilitate protection of copyrights of audio content publishers. Below are listed several of such goals.

Perceptual Invisibility. The embedded information should not induce audible changes in the audio quality of the resulting watermarked signal. The test of perceptual invisibility is often called the "golden ears" test.

Statistical Invisibility. The embedded information should be quantitatively imperceptive for any exhaustive, heuristic, or probabilistic attempt to detect or remove the watermark. The complexity of successfully launching such attacks should be well beyond the computation power of publicly available computer systems.

Tamperproofness. An attempt to remove the watermark should damage the value of the music well above the hearing threshold.

Cost. The system should be inexpensive to license and implement on both programmable and application-specific platforms.

Non-disclosure of the Original. The watermarking and detection protocols should be such that the process of proving audio content copyright both in-situ and in-court, does not involve usage of the original recording.

Enforceability and Flexibility. The watermarking technique should provide strong and undeniable copyright proof. Similarly, it should enable a spectrum of protection levels, which correspond to variable audio presentation and compression standards.

Resilience to Common Attacks. Public availability of powerful digital sound editing tools imposes that the watermarking and detection process is resilient to attacks spawned from such consoles. The standard set of plausible attacks is itemized in the Request for Proposals (RFP) of IFPI (International Federation of the Phonographic Industry) and RIAA (Recording Industry Association of America). The RFP encapsulates the following security requirements:

two successive D/A and A/D conversions,
data reduction coding techniques such as MP3,
adaptive transform coding (ATRAC),
adaptive subband coding,
Digital Audio Broadcasting (DAB),
Dolby AC2 and AC3 systems,
applying additive or multiplicative noise,
applying a second Embedded Signal, using the same system, to a single program fragment,
frequency response distortion corresponding to normal analogue frequency response controls such as bass, mid and treble controls, with maximum variation of 15 dB with respect to the original signal, and
applying frequency notches with possible frequency hopping.

Watermark Circumvention

If the encoding of a watermark can thwart a malicious attack, then it can avoid the harm of the introduction of unintentional noise. Therefore, any advancement in watermark technology that makes it more difficult for a malevolent attacker to assail the watermark also makes it more difficult for a watermark to be altered unintentionally.

In general, there are two common classes of malevolent attacks:

1. De-synchronization of watermark in digital audio signals. These attacks alter audio signals in such a way to make it difficult for the detector to identify the location of the encoded watermark codes.
2. Removing or altering the watermark. The attacker discovers the location of the watermark and intentionally alters the audio clip to remove or deteriorate a part of the watermark or its entirety.

Framework to Thwart Attacks

Accordingly, there is a need for a new framework of protocols for hiding and detecting watermarks in digital audio signals that are effective against malevolent attacks. The framework should possess several attributes that further the desiderata of watermark technology, described above. For example, such desiderata include "perceptual invisibility" and "statistical invisibility". The framework should be tamperproof and inexpensive to license and implement on both programmable and application-specific platforms. The framework should be such that the process of proving audio content copyrights both in-situ and in-court does not involve usage of the original recording.

The framework should also be flexible to enable a spectrum of protection levels, which correspond to variable audio presentation and compression standards, and yet resilient to common attacks spawned by powerful digital sound editing tools.

In addition, the framework will facilitate search for the "El Dorado" and the "Holy Grail" of watermarking technology.

The seemingly unattainable "El Dorado" of watermarking technology is an encoded watermark that is unalterable, irremovable, and cannot be de-synced without perceptually and noticeably affecting the audio quality.

Likewise, the seemingly unattainable "Holy Grail" of watermarking technology is an encoded watermark where a malevolent attacker may know how the watermark is encoded, but still cannot effectively attack it without perceptually and noticeably affecting the audio quality.

SUMMARY

Described herein is an audio watermarking technology for inserting and detecting watermarks in audio signals, such as a music clip. The watermark identifies the content producer, providing a signature that is embedded in the audio signal and cannot be removed. The watermark is designed to survive all typical kinds of processing, including compression, equalization, D/A and A/D conversion, recording on analog tape, and so forth. It is also designed to survive malicious attacks that attempt to remove or modify the watermark from the signal, including changes in time and frequency scales, pitch shifting, and cut/paste editing.

In one described implementation, a watermarking system employs chess spread-spectrum sequences (i.e., "chess watermarks") to improve the balance of positive and negative chips in the watermarking sequences. The balance is not imposed in an orderly fashion, which might make the watermark sequence more easily detectable to an attacker, but in a pseudo-random fashion. In that way, better sequence balance is achieved while preserving its randomness for an attacker without knowledge of the keys.

In another described implementation, a watermarking system employs an energy-level trigger to determine whether to skip encoding of a portion of a watermark within a given time span of an audio clip. If a large discrepancy in energy levels exists over a given time frame, then the frame is not watermarked, to avoid audible time-dispersion of artifacts due to spectral modifications (which are similar to "pre-echo" effects in audio coding). In another described implementation, a watermarking system begins encoding of a watermark at a variable position after the beginning of an audio clip.

BRIEF DESCRIPTION OF THE DRAWINGS

The same numbers are used throughout the drawings to reference like elements and features.

DETAILED DESCRIPTION

The following description sets forth a specific embodiment of the improved stealthy audio watermarking that incorporates elements recited in the appended claims. This embodiment is described with specificity in order to meet statutory written description, enablement, and best-mode requirements. However, the description itself is not intended to limit the scope of this patent. Rather, the inventors have contemplated that the claimed improved stealthy audio watermarking might also be embodied in other ways, in conjunction with other present or future technologies.

Incorporation by Reference

The following provisional application (from which priority is claimed) is incorporated by reference herein: U.S. Provisional Patent Application Ser. No. 60/143432 entitled "Improved Audio Watermarking" filed on Jul. 13, 1999.

In addition, the following co-pending patent applications are incorporated by reference herein:

U.S. patent application Ser. No. 09/316,899, entitled "Audio Watermarking with Dual Watermarks" filed on May 22, 1999, and assigned to the Microsoft Corporation; and U.S. patent application Ser. No. 09/259,669, entitled "A System and Method for Producing Modulated Complex Lapped Transforms" filed on Feb. 26, 1999, and assigned to the Microsoft Corporation.

The following U.S. patent is incorporated by reference herein: U.S. Pat. No. 6,029,126, entitled "Scalable Audio Coder and Decoder" issued on Feb. 22, 2000, and assigned to the Microsoft Corporation.

Introduction

Described herein are at least three exemplary implementations of improved stealthy audio watermarking (i.e., "exemplary watermarking"). The first exemplary watermarking implementation employs chess spread-spectrum sequences (i.e., "chess watermarks") to improve the short-time statistical balance of watermark sequences. To detect such a watermark, a watermark detector is aware that watermarks were encoded using the exemplary chess watermarking.

The second exemplary watermarking implementation employs watermark encoding triggered by the energy level of the signal (i.e., "energy-level trigger"). To detect a watermark, the detector need not be aware that watermarks were encoded using the exemplary watermarking with energy-level triggering.

The third exemplary watermarking implementation employs variable starting position for watermark encoding (i.e., "variable-starting position"). To detect a watermark, the detector need not be aware that watermarks were encoded using the exemplary watermarking with variable start.

Figure 1:
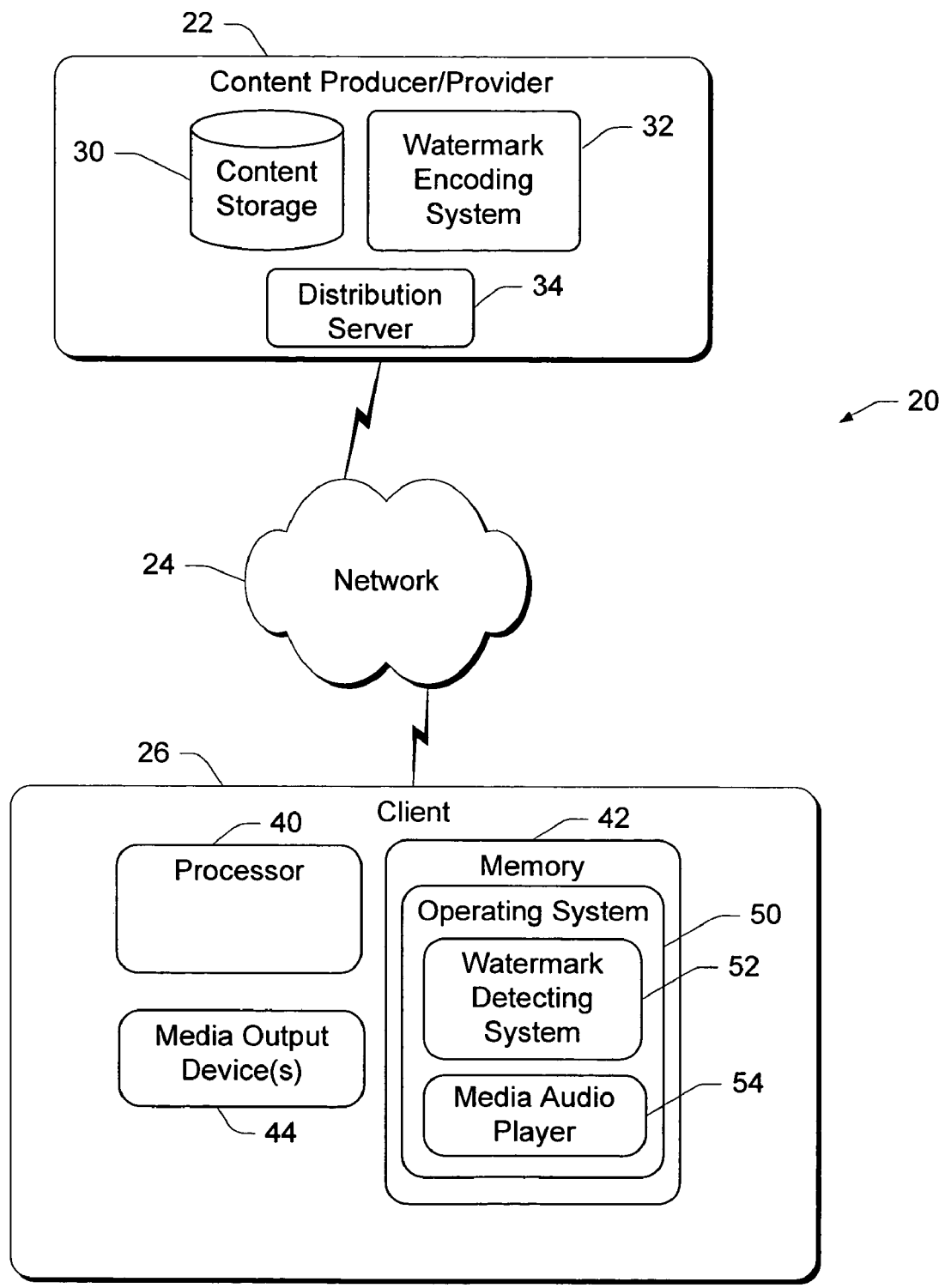
FIG. 1 is a block diagram of an audio production and distribution system in which a content producer/provider watermarks audio signals and subsequently distributes that watermarked audio stream to a client over a network.
Figure 13:
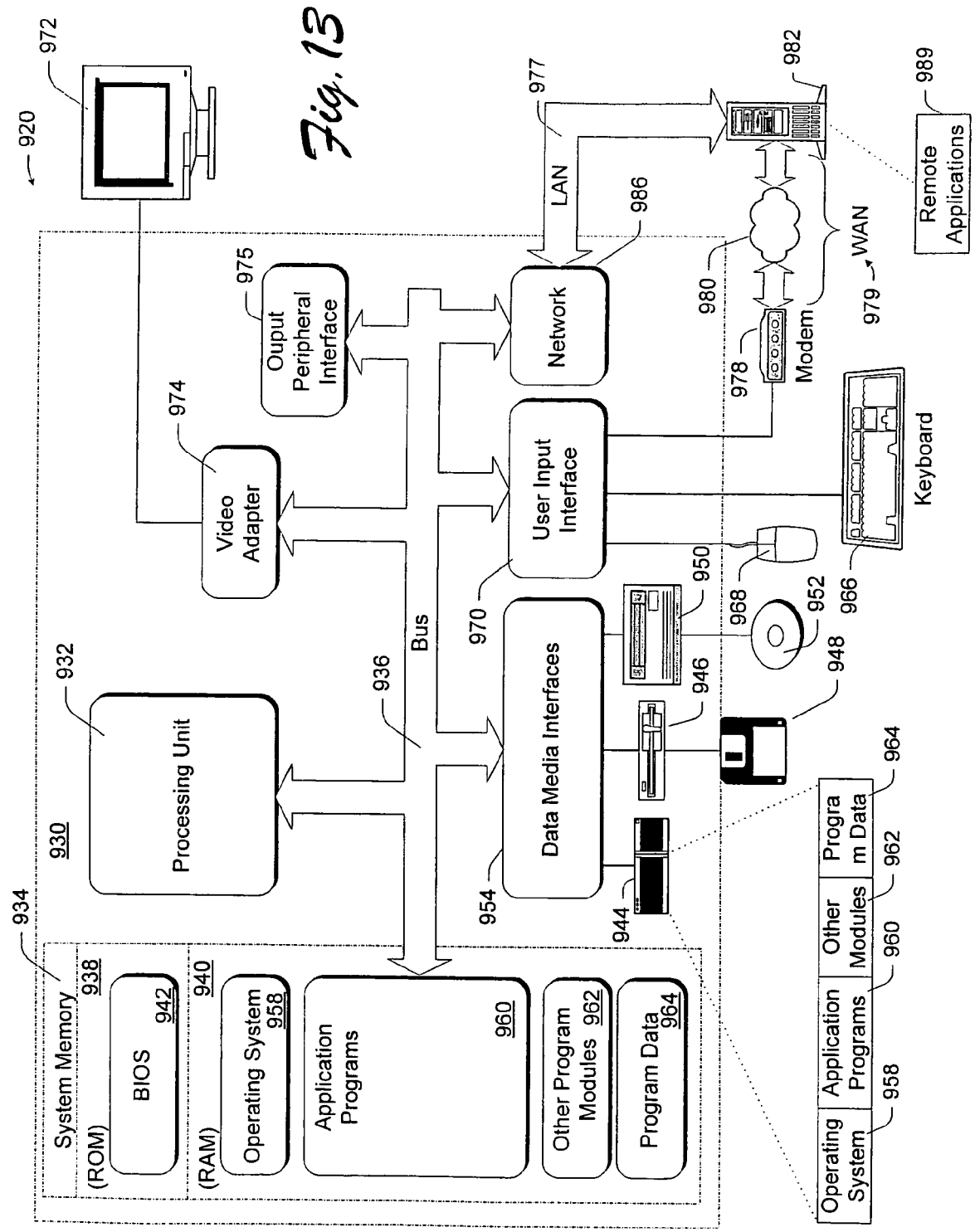
FIG. 13 is an example of a computing operating environment capable of implementing the improved stealthy audio watermarking.

The exemplary watermarking implementations, described herein, may be at least implemented by an audio production and distribution system like that shown in FIG. 1 and by a computing environment like that shown in FIG. 13.

The exemplary watermarking implementations, described herein, further many of the goals of watermarking. They bring one to the gates of the city of "El Dorado" where an encoded watermark is unalterable, irremovable, and cannot be de-synced without perceptually and noticeably affecting the audio quality. Likewise, they bring one within reach of the "Holy Grail" where a malevolent attacker may know how the watermark is encoded, but still cannot effectively attack it without perceptually and noticeably affecting the audio quality.

A watermark may be generically called an "information pattern of multiple discrete values" because it is a pattern of binary bits designed to convey information. A watermark is encoded in a digital audio signal (or clip). In relation to the watermark, the audio signal is effectively "noise." In general, watermarking involves hiding the information contained in the watermark within the "noise" of a digital signal.

Audio Production and Distribution System Employing Watermarks

FIG. 1 shows an audio production and distribution system 20 having a content producer/provider 22 that produces original musical content and distributes the musical content over a network 24 to a client 26. The content producer/provider 22 has a content storage 30 to store digital audio streams of original musical content. The content producer 22 has a watermark encoding system 32 to sign the audio data stream with a watermark that uniquely identifies the content as original. The watermark encoding system 32 may be implemented as a standalone process or incorporated into other applications or an operating system.

A watermark is an array of bits generated using a cryptographically secure pseudo-random bit generator and a new error correction encoder. The pseudo-uniqueness of each watermark is provided by initiating the bit generator with a key unique to each audio content publisher. The watermark is embedded into a digital audio signal by altering its frequency magnitudes such that the perceptual audio characteristics of the original recording are preserved. Each magnitude in the frequency spectrum is altered according to the appropriate bit in the watermark.

The watermark encoding system 32 applies the watermark to an audio signal from the content storage 30. Typically, the watermark identifies the content producer 22, providing a signature that is embedded in the audio signal and cannot be removed. The watermark is designed to survive all typical kinds of processing, including compression, equalization, D/A and A/D conversion, recording on analog tape, and so forth. It is also designed to survive malicious attacks that attempt to remove the watermark from the signal, including changes in time and frequency scales, pitch shifting, and cut/paste editing.

The content producer/provider 22 has a distribution server 34 that streams the watermarked audio content over the network 24 (e.g., the Internet). An audio stream with a watermark embedded therein represents to a recipient that the stream is being distributed in accordance with the copyright authority of the content producer/provider 22. The server 34 may further compress and/or encrypt the content conventional compression and encryption techniques prior to distributing the content over the network 24.

The client 26 is equipped with a processor 40, a memory 42, and one or 1 more media output devices 44. The processor 40 runs various tools to process the audio stream, such as tools to decompress the stream, decrypt the date, filter the content, and/or apply audio controls (tone, volume, etc.). The memory 42 stores an operating system 50 (such as a Microsoft® Windows 2000® operating system), which executes on the processor. The client 26 may be embodied in a many different ways, including a computer, a handheld entertainment device, a set-top box, a television, an audio appliance, and so forth.

The operating system 50 implements a client-side watermark detecting system 52 to detect watermarks in the audio stream and a media audio player 54 to facilitate play of the audio content through the media output device(s) 44 (e.g., sound card, speakers, etc.). If the watermark is present, the client can identify its copyright and other associated information.

The operating system 50 and/or processor 40 may be configured to enforce certain rules imposed by the content producer/provider (or copyright owner). For instance, the operating system and/or processor may be configured to reject fake or copied content that does not possess a valid watermark. In another example, the system could play unverified content with a reduced level of fidelity.

Watermark Insertion and Detection

Some of the basal details of watermark insertion and detection are thoroughly described in U.S. patent application Ser. No. 09/316,899, entitled "Audio Watermarking with Dual Watermarks" filed on May 22, 1999 (which, as indicated above, is incorporated by reference, herein).

Figure 2:
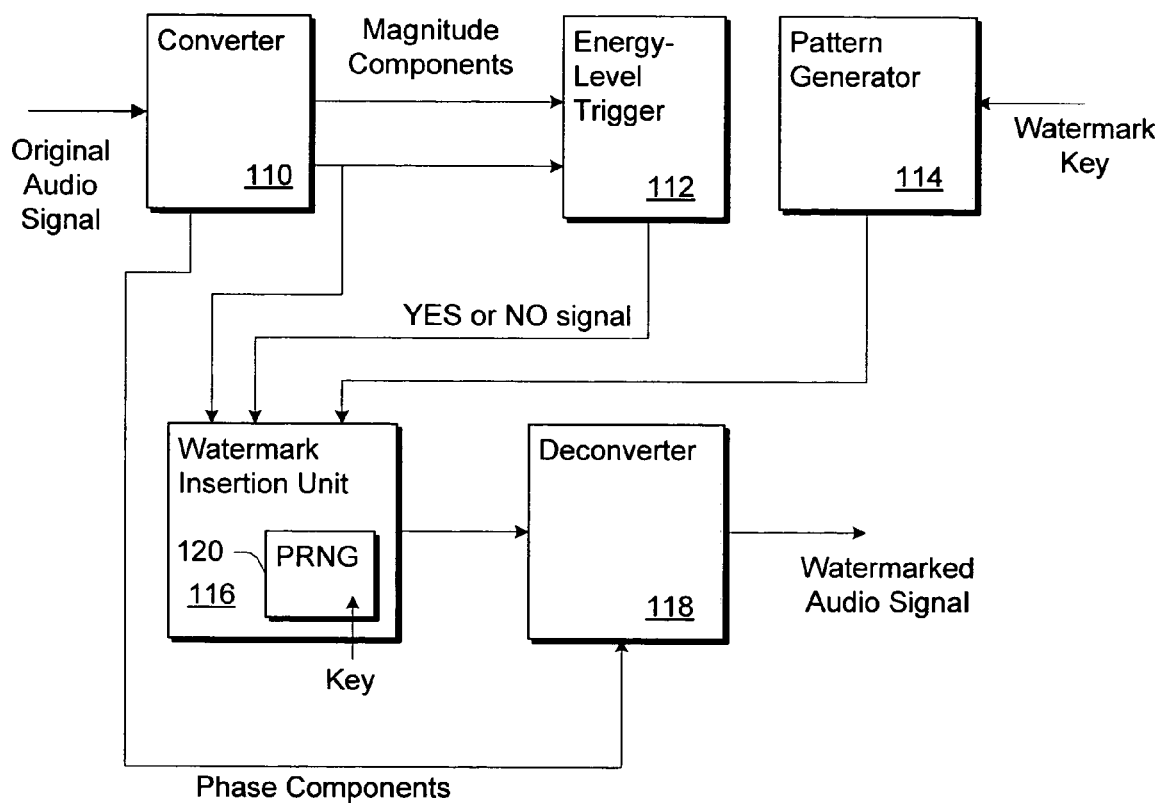
FIG. 2 is a block diagram of a watermarking encoding system implemented, for example, at the content producer/provider.

In general, FIG. 2 shows a watermark encoding system 100 (or simply "watermark encoder") that may be implemented at a content provider/producer to encode the audio signal with a watermark. The watermark encoding system 100 has a converter 110 to convert an audio signal into frequency-domain magnitude and phase components. It may also include an energy-level trigger 112 to determine whether the energy level across a portion of the signal warrants encoding of the watermark in that portion.

The watermark encoding system 100 also has a pattern generator 114 to generate the watermark and a watermark insertion unit (WIU) 116 to insert the watermark into the signal. The pattern generator typically includes a pseudorandom number generator (PRNG) to generate a watermark based upon a watermark key. The WIU 116 receives magnitude components from the converter 110, a triggering signal from the trigger 112, and the watermark from the pattern generator 114. The trigger 112 generates a YES/NO signal to indicate to a watermark insertion unit whether to encode a watermark in a specified portion of a signal.

The watermark encoding system 100 has a deconverter 118 to convert the audio signal back into the time domain. Pseudorandom number generator (PRNG) 120 is employed to implement the exemplary watermarking, but its role is explained later.

Figure 3:
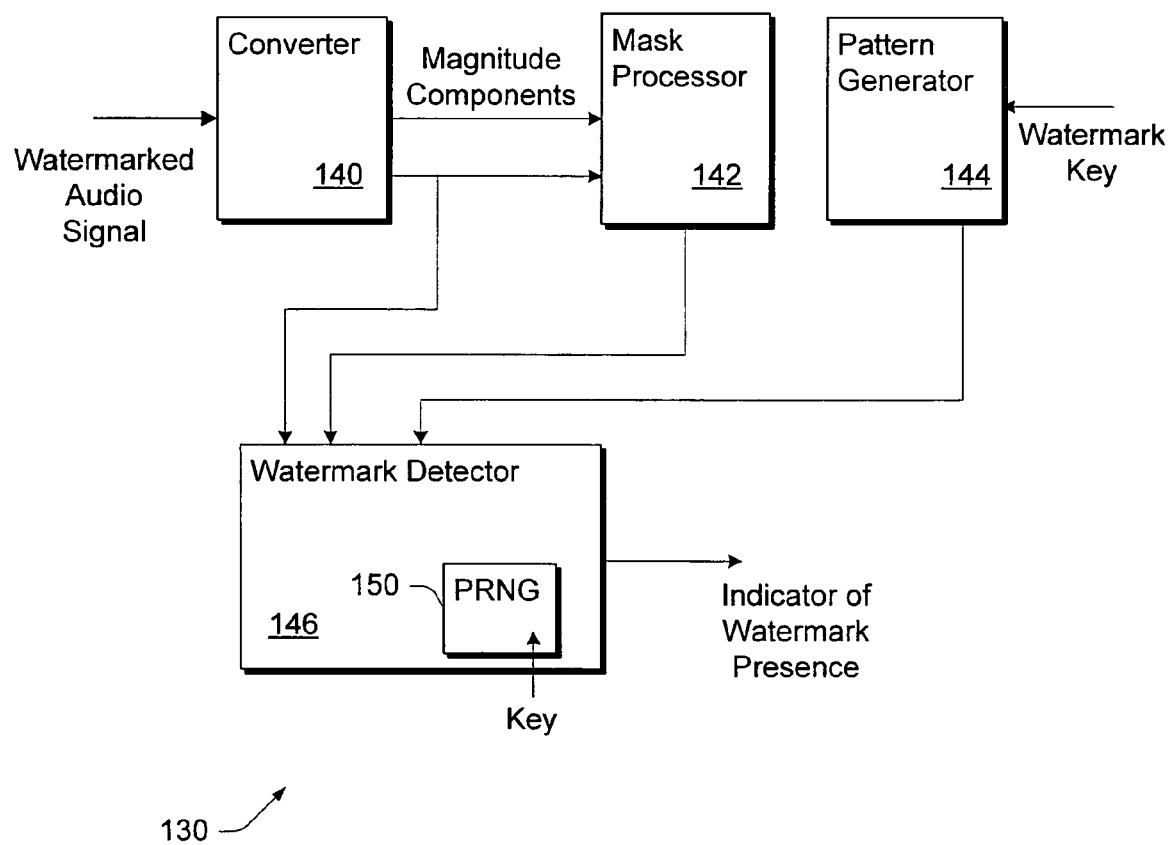
FIG. 3 is a block diagram of a watermarking detecting unit implemented, for example, at the client.

In general, FIG. 3 shows a watermark detecting system 130 (or simply "watermark detector") that may be implemented at a client that plays the audio clip (containing the audio signal). In addition, it may be implemented in an audio management and distribution subsystem (for example, in an application that downloads music clips from the Internet and uploads them to portable devices).

The watermark detecting system 130 has a converter 140, a mask processor 142, and a watermark pattern generator 144. The converter 140 converts an audio signal that is suspected to include a watermark. It converts the signal into its frequency-domain magnitudes. The mask processor 142 determines the hearing threshold for frequency-domain magnitude components. The pattern generator 144 generates a comparison watermark based upon the same watermark key as used by the encoder. The pattern generator 144 typically includes a pseudorandom number generator (PRNG) to generate the comparison watermark based upon a watermark key.

The watermark detecting system 130 is also equipped with a watermark detector 146 that locates a watermark in the audio clip. The watermark detector 146 determines which block interval of the watermarked audio signal contains a watermark pattern and whether that discovered watermark pattern matches the comparison watermark generated by the pattern generator 144. Pseudorandom number generator (PRNG) 150 is employed to implement the exemplary watermarking, but its role is explained later.

Blocks and Frames

During the encoding, the original audio signal is processed into equally sized, overlapping, time-domain blocks. Each of these blocks is the same length of time. For example, one second, two seconds, 50 milliseconds, and the like. In addition, these blocks overlap equally so that half of each block (except the first and last) is duplicated in an adjacent block.

For example, suppose that an audio clip is divided into overlapping, two-second long, time-domain blocks. This means that each block has a one second overlap with its neighbors. If the clip were about 3.5 minutes long, then there would be about 210 blocks.

Figure 4A:
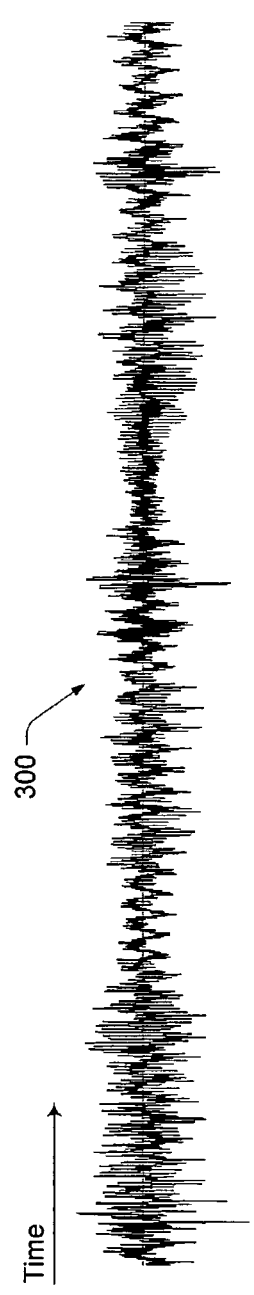
FIGS. 4A-4D show graphs of an audio clip to illustrate blocking and framing of such audio clip.
Figure 4B:
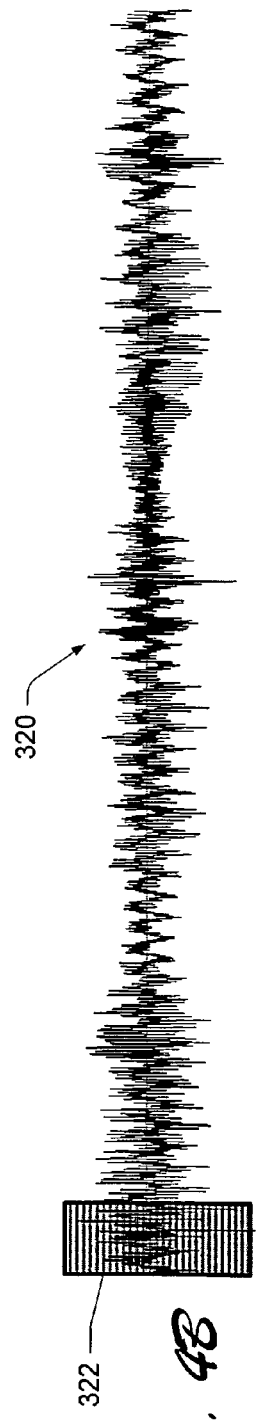

FIG. 4A shows a graph 300 of an audio signal in the time domain. Time advances from left to right. FIG. 4B shows a graph 320 of the same audio signal sampled over the same time period. FIG. 4B includes a block 322 representing a first of equally spaced, overlapping, time-domain blocks.

Each block is transformed by a MCLT (modulated complex lapped transform) to the frequency domain. This produces a vector having a defined number of magnitude and phase components. The magnitude is measured in a logarithmic scale, in decibels (dB).

Figure 4C:
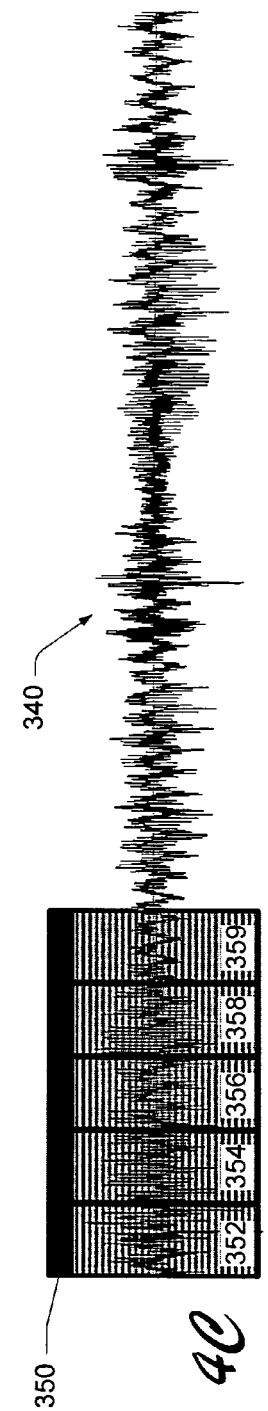

FIG. 4C shows a graph 340 of the same audio signal sampled over the same time period. In FIG. 4C, there is a set 350 of five adjacent blocks 352-359. The blocks represent equally spaced, overlapping, time-domain blocks. (For simplicity, the overlapping nature of the blocks is not shown.) The set 350 is called a "frame." A frame may include any given number of blocks.

Figure 4D:
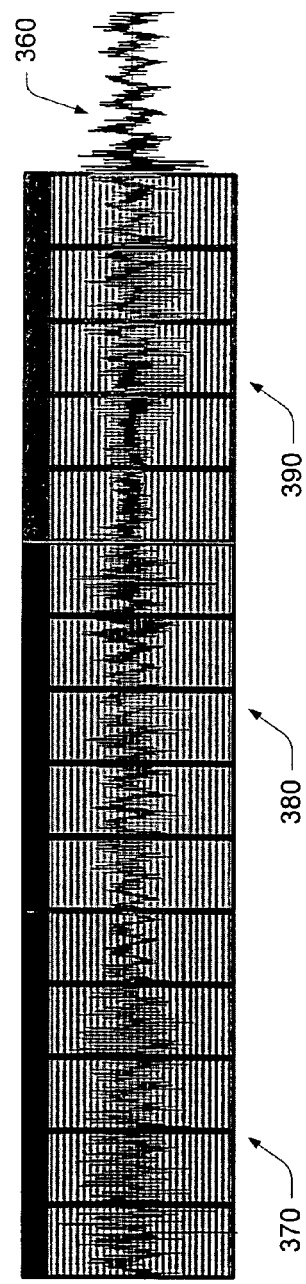

FIG. 4D shows a graph 360 of the same audio signal sampled over the same time period. In FIG. 4D, there are three frames 370, 380, and 390. Each frame has five adjacent blocks. The blocks represent equally spaced, overlapping, time-domain blocks. (For simplicity, the overlapping nature of the blocks is not shown.)

Figure 5:
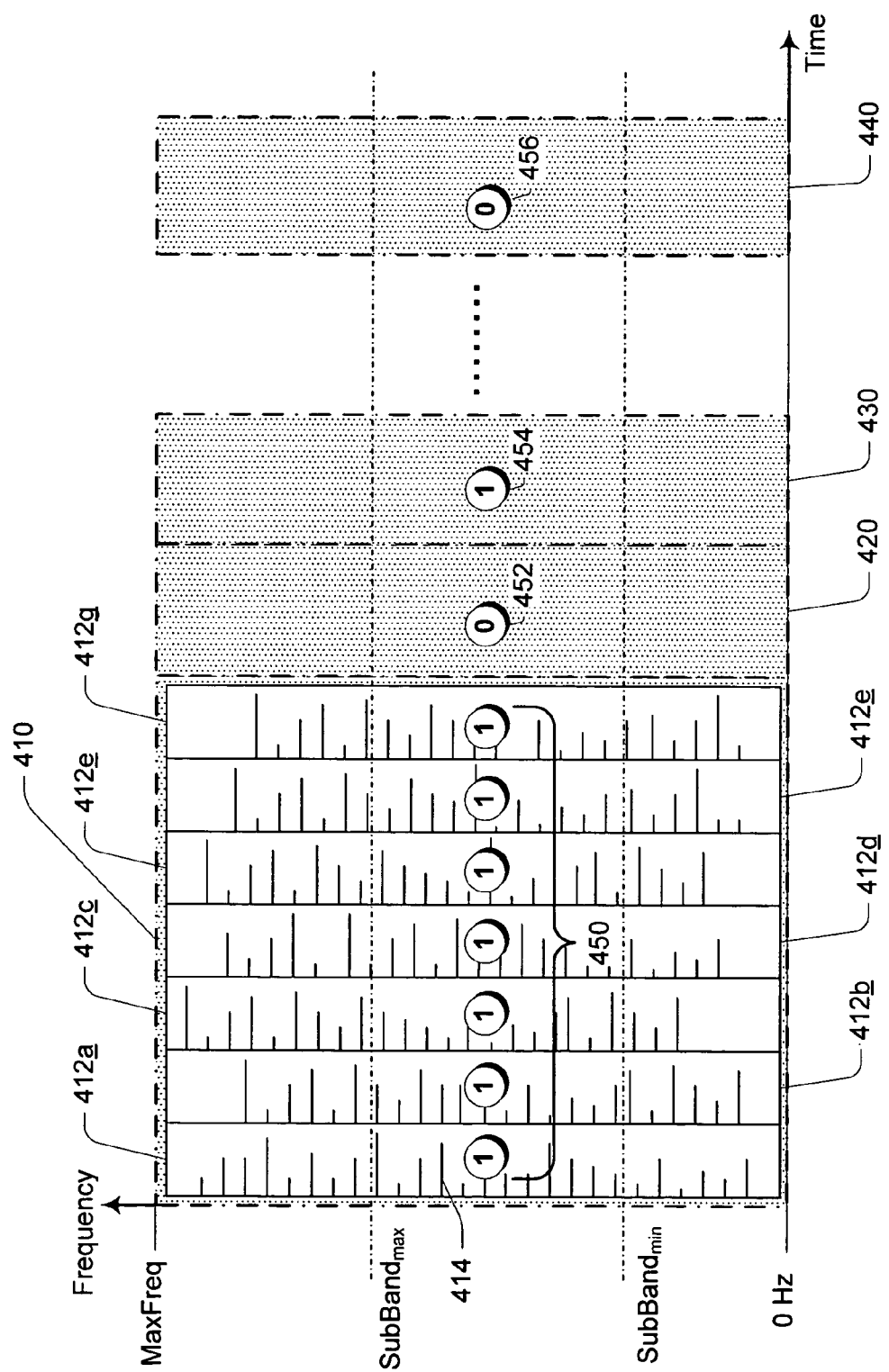
FIG. 5 illustrate sample blocks and sample frames of an audio clip and further illustrate the encoding of bit values of a watermark within such blocks and frames.

FIG. 5 shows a graph 400 of the same audio clip of FIGS. 4A-4B, but this graph does not show the clip in the time domain. Rather, it shows a graph in the frequency-domain for each overlapping, time-domain block (like blocks 352-359 in FIG. 4C). Time advances from left to right. This is from the beginning of the audio clip to the end. Frequency increases from bottom to top. From zero to a maximum frequency of interest ("MaxFreq").

In FIG. 5, each of blocks 412a-g contain a frequency-domain graph for its time blocks. Horizontal hash marks, like mark 414, represent the magnitude of a given frequency range. Each watermark chip is encoded in multiple frequency subbands in a range from "$SubBand_{max}$" line and "$SubBand_{min}$" line as shown in FIG. 5.

A given number of blocks (such as blocks 412a-g) form a "frame" (such as frame 410). Each frame includes the same number of blocks. In FIG. 5, frames 420, 430, and 440 includes the same number of blocks.

Encoding Bits of a Watermark

A watermark is composed of a given number of bits (such as eighty bits). The bits of a watermark are encoded by slightly increasing and decreasing the magnitude of frequencies within a block. This slight change is plus or minus Q decibel (dB), where Q is set to 1 for example. These frequency changes are not heard because they are too small. Again, these frequency magnitudes are represented by horizontal hash marks, like mark 414.

More specifically, only the frequencies between the $SubBand_{max}$ and $SubBand_{min}$ lines are modified to encode a bit of the watermark.

Redundancy Encoding

Successive Redundancy of Full Watermark. Using the exemplary watermarking, successive bits are stored in successive frames. One bit is encoded in each frame. For example, suppose the watermark is eighty bits long. The first three bits of the watermark in this example is "101" and its last bit is "0". Also, suppose that frame 410 is frame one, frame 420 is frame two, and so forth until frame 440 is frame eighty.

In this example, frame 410 will have the first bit of the watermark encoded therein. That bit is "1" and is represented by indicator 450. Frame 420 will have the second bit of the watermark encoded therein. That bit is "0" and is represented by indicator 452. Frame 430 will have the third bit of the watermark encoded therein. That bit is "1" and is represented by indicator 454. Finally, frame 440 will have the last bit of the watermark encoded therein. That bit is "0" and is represented by indicator 456.

Typically, the full audio clip in which the watermark is being encoded is longer than time elapsed for the eighty frames. Therefore, this process is repeated until the end of the audio clip. In one implementation, it was determined that approximately eleven seconds was required to encode a watermark. Thus, in a four-minute clip, the watermark will be encoded approximately twenty-one times in successive sets of eighty frames. That allows the watermark to be detected even by looking only at a small portion of the audio clip.

Redundancy within a Frame. As described above, each frame has one bit of the watermark encoded therein. That one bit is encoded in each block of a frame. This means that within each block in a frame is encoded the exact same bit. For example, indicator 450 of FIG. 5 shows that each block in frame 410 has a bit value of "1" encoded therein.

When a bit of a watermark is detected from an audio clip, the detector reads the bit from the block in the middle of frame. In frame 410 of FIG. 5, the middle block is block 412*d*.

The redundancy within a frame is designed to thwart malevolent desynchronization attacks in the time-domain. In other words, it lessens the effect of time-shifting the audio clip. Since it reads what it believes to be the middle block of a frame, it will still read the correct bit value even if the clips is shifted over an amount of time equal to about half of a frame.

Redundancy Problem

The relative quantity of bits in a normal audio clip is roughly balanced between "1's" and "0's." Likewise, the distribution of bits (i.e., "1's" and "1's") in a normal audio clip is roughly evenly distributed throughout the clips and over most any given portion of such clip. This assumption is correctly made because an audio clip is a digital representation of an analog recording (such as music and talking).

In generally, entropy is a quantitative measure of uncertainty. Entropy may also be defined as a measure of the disorder or randomness in a closed system. Therefore, the bits of an original audio signal appear to be disordered and random Anything that is digitally encoded typically has a pattern so that it may be recognized by a detector. Since a purposeful action places some order upon a signal, the bits in such a signal no longer appear random and disordered. Digital pirates know this. They also know that the digitally encoded pattern is typically repeated in an audio clip.

Therefore, one type of malevolent attack is to search an audio clip for patterns, particularly repeated patterns. Of course, redundancy itself is a pattern. Once a pirate finds such a pattern, he or she may attempt to remove it, change it, or scramble it. This is done so that the detector either does not find a watermark or misidentifies a watermark.

However, as discussed above the watermark itself is repeated throughout the audio clip and each bit of the watermark is repeated in a series of blocks within a frame. With such pattern redundancy, there is an increased danger of detection by a malicious attacker.

Entropy-Balancing of Watermarks

Using the exemplary chess watermarking, the patterns are effectively "hidden" by further encoding (re-encoded) them to obscure the patterns. The patterns may still be found by the detector because it knows how they were re-encoded and thus, the detector "de-re-encodes" before it detects the watermark as normal.

Generically, this technique may be referred to as "entropy-balancing" of patterns, in particular, watermarks. After such entropy-balancing, the bits in a pattern no longer appear to be organized, ordered, and non-random. Rather, the bits of the pattern appear to be disorganized, unordered, and random. Thus, the entropy of the bits of the pattern appears to be balanced. A watermark generated by the exemplary watermarking techniques is a "watermark with balanced entropy."

The exemplary watermarking has the ability to tell the value of the next bit generated by a pseudorandom number generator (PRNG) under any previous history of generated bits.

Figure 6A:
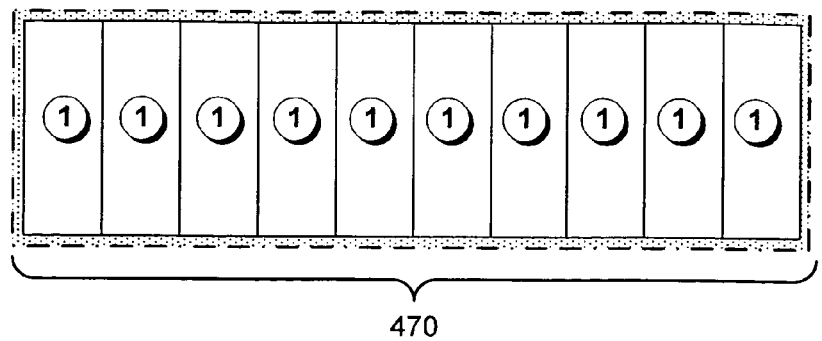
FIGS. 6A-6D show redundant encoding of a bit in the blocks of a frame and the effect of implementations of chess watermarking techniques.
Figure 6B:
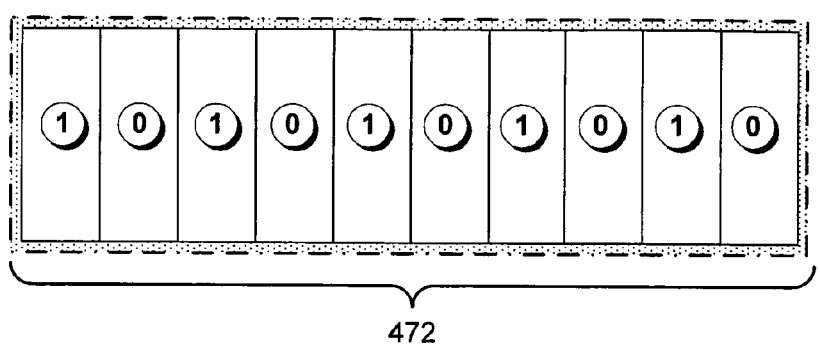

FIGS. 6A-6B illustrate entropy-balancing of blocks in a frame. Since each frame represents one bit of a watermark, the entropy-balancing of each frame effectively entropy-balances the entire encoded watermark. To further hide the watermark pattern, each encoded watermark is entropy-balanced independently from each of the other watermarks. Therefore, the same entropy-balanced watermark is not simply repeated.

FIG. 6A shows a frame 470 of ten blocks. Although a frame typically has an odd number of blocks, this is provided for illustration purposes only. The frame represents one bit of an encoded watermark. That bit is "1." As shown in FIG. 6A, each block is encoded with that bit. Thus, the blocks of frame 470 have encoded therein the same original bit.

However, this is a clear pattern of repeated "1's." While such a pattern may appear naturally, it is not natural for a set of exactly ten homogeneous bits (either all "0's" or all "1's") to appear one after the other. This pattern is not entropy-balanced. A digital bandit may easily discover such pattern.

FIG. 6B shows the results of "absolute-chessboading" the pattern in frame 472. Absolute chessboarding is one option for hiding a pattern. Absolute chessboarding changes every other block. For example, the pattern of the original frame

470 is "1111111111" is absolutely chessboarded into alternating "1's" and "0's" beginning with "1." In FIG. 6B, the absolutely chessboarded pattern of frame 472 is now "1010101010." In this example, every other block is reversed starting with the second block. Alternatively, such reversal may begin with the first block.

This absolute-chessboard pattern represents a perfect distribution of bits within a frame. The "1's" and "0's" are perfectly distributed within a frame. However, this distribution is probably too perfect. Each frame begins with either a "1" or a "0" and the remainder of the frame has perfect bit distribution. Thus, this repeating pattern is discoverable.

Although an absolutely chessboarded pattern (such as that of frame 472) may be more difficult to discover than a solid pattern (such as that of frame 470), it is still a redundant pattern of alternating bits every ten blocks. An absolutely chessboarded pattern is still a recognizable pattern; thus, it is not entropy-balanced.

Pseudorandom-Chessboarding

Figure 6C:
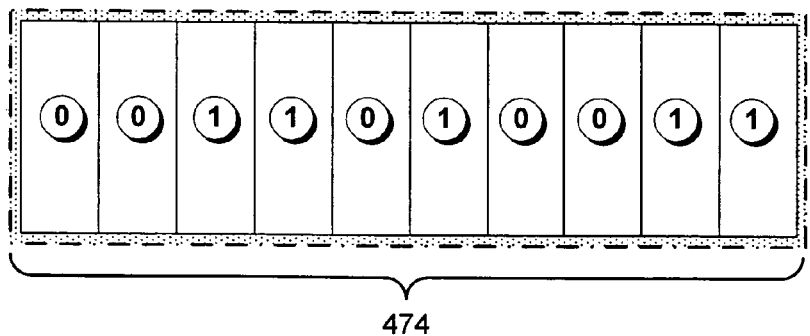
Figure 6D:
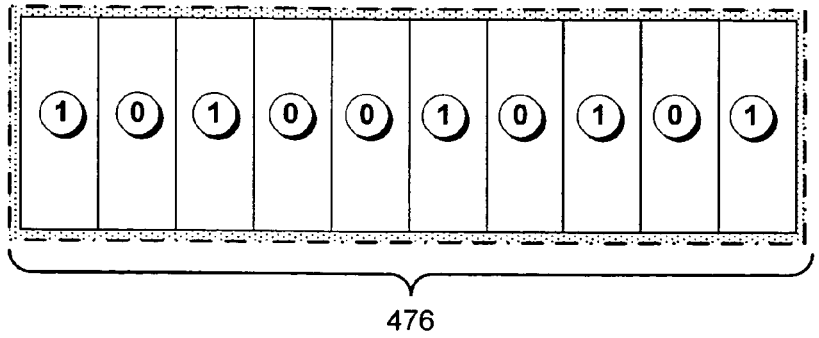

FIGS. 6C and 6D illustrate the results of pseudorandom-chessboarding the pattern in frame 472. When compared to frames 470 and 472, the patterns of frames 474 and 476 appear to be random and non-ordered.

To generate this pseudorandom-chessboard pattern, each block is processed by a pseudorandom number generator (PRNG) so that the resulting pattern is entropy-balanced.

When encoding a bit of the watermark into a frame, the encoder (within the watermark insertion unit 116 of FIG. 2) processes the bit of each block before inserting it. The PRNG (such as PRNG 120 in FIG. 2) gives a result (typically between 0 and 1), which is compared to a threshold value. If that threshold value is 0.5, then the result is an absolute chessboarded pattern. If that threshold value is 1 or 0, then the result is the same or the reverse of the original pattern. Therefore, the threshold value is typically a value that does not approach 0.5, 0, or 1. In the s exemplary chess watermarking, the threshold value is typically 0.65-0.85.

The watermark encoder and detector use the same PRNG engine (such as PRNG 120 in FIG. 2 and PRNG 150 in FIG. 3) and the same key. This key may be the watermark key and typically accompanies the digital audio file in a cryptographic manner. Since the encoder and detector use the same PRNG engine and key, the resulting pattern of determining when to alternate bits is the same for both the encoder and detector. Alternatively, a look-up table may be used to achieve the same results.

FIG. 6D illustrates the preferred results of such pseudo-random-chessboarding. A frame (and consequently the repeated watermark in the entire audio clip) is the most entropy-balanced when the pattern approaches the ideal distribution of alternating "1's" and "0's," but it does not reach it. Frame 476 has this entropy-balanced pattern: "1010010101." Although not shown, the next frame may have this pattern: "0110101011." With similar minor variation from the ideal distribution in each frame of the watermark, the pattern will be nearly impossible to discover without knowledge of the PRNG engine and the key (or of the look-up table).

Although FIG. 6D does illustrate the preferred results of such pseudorandom-chessboarding where the pattern approaches the ideal distribution. Those of ordinary skill in the art understand and appreciate that "entropy-balanced" refers to an apparently random and disorderly pattern between the solid pattern of frame 470 and the ideal distribution of frame 472.

A watermark that results from chessboarding may be called a "chess watermark" because it appears to be a chessboard if graphed two-dimensionally. Likewise, the act of processing a watermark in this fashion may be called "chess watermarking" or "chessboarding."

Methodological Implementation of Exemplary Chess Watermark Encoding

Figure 7:
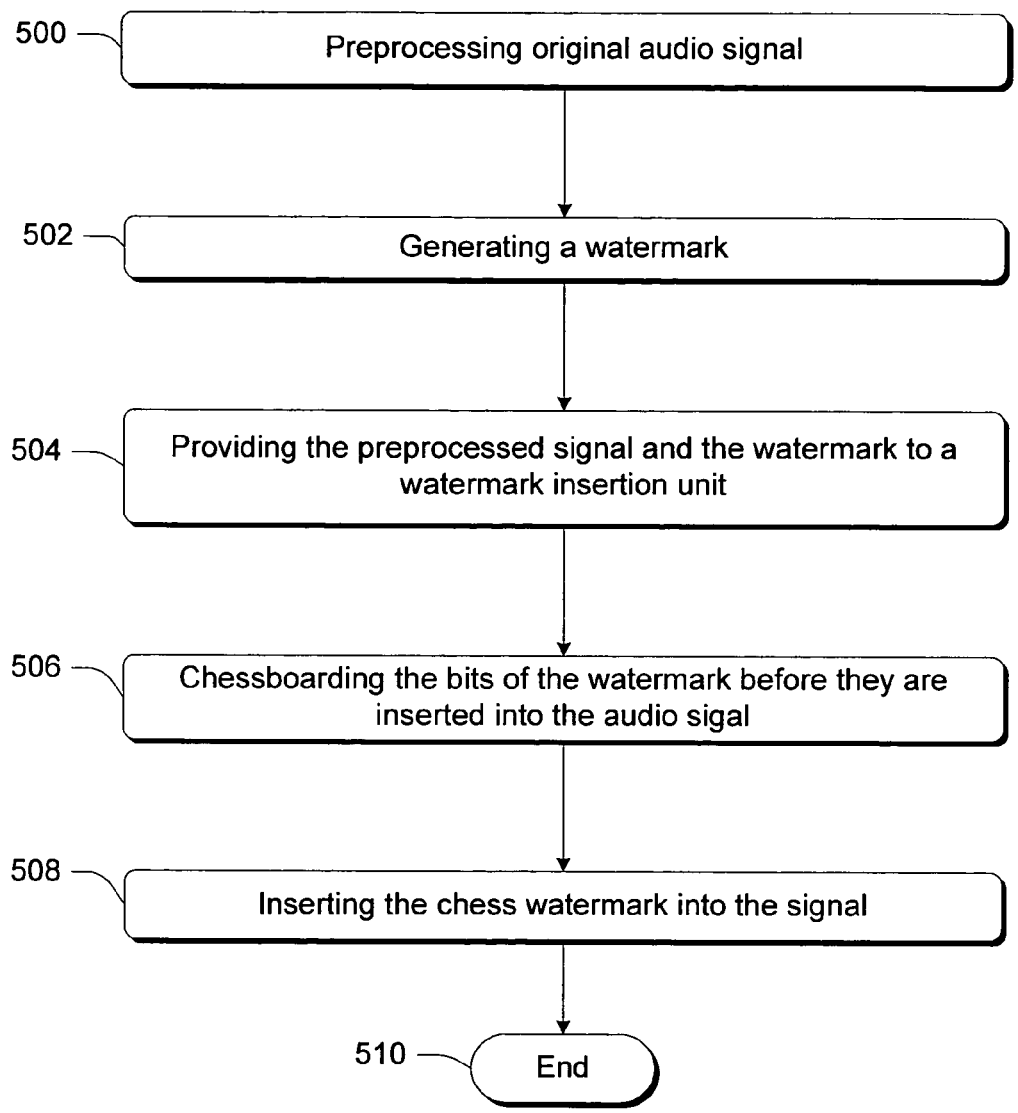
FIG. 7 is a flow diagram showing a methodological implementation of chess watermark encoding.

FIG. 7 shows a methodological implementation of the exemplary chess watermark encoding. At 500, an original audio signal (such as from an audio clip) is preprocessed. The effective result of such preprocessing is to produce blocks and frames as described above.

Furthermore, such signal preprocessing is generally described above in reference to the watermark encoding system of FIG. 2. It is also described in more detail in co-pending patent application: U.S. patent application Ser. No. 09/316,899, entitled "Audio Watermarking with Dual Watermarks" filed on May 22, 1999.

At 502, the watermark encoder generates a watermark in accordance with watermark generation described above and in the "Audio Watermarking with Dual Watermarks" co-pending application.

At 504, the blocks of the audio signal and the watermark are provided to a watermark insertion unit (such as unit 116 in FIG. 2). At 506, before the bits of the watermark are inserted into the signal, they are "chessboarded." For example, a PRNG (such as PRNG 120 in FIG. 2) generates a pseudorandom number to determine whether to switch a bit.

At 508 in FIG. 7, the resulting chess watermark is inserted into the audio signal. At 510, this process ends.

The following are two examples of pseudocode that may be used to implement exemplary chess watermark encoding:

---

Example One: Pseudorandom-Chessboarding using a PRNG

---

```
INPUT={SECRET_KEY}
OUTPUT={WATERMARK(S,K) OF LENGTH K={2,4,6,8} TIME BLOCKS IN S
SUBBANDS}
```
---
```
CREATE_CHESS_WATERMARK (SECRET_KEY) {
    INITIATE PSEUDO_RANDOM_NUMBER_GENERATOR RANDOM with SECRET_KEY
    { PROBABILISTIC AUTOMATON:
        STATE[0] = OUTPUT ZERO
        STATE[1] = OUTPUT ONE
        CHANGE_STATE (STATE (Y)): GENERATE p=RANDOM( ): if p>THRESHOLD
goto STATE(not(Y)) else stay in STATE(Y)
            //common watermarks (absolute chessboard) are generated
            //with THRESHOLD=1/2. Using this automaton, it enforces
```

```
            //arbitrarily the probability that bits in consecutive
            //blocks in the same subband are toggled. TYPICALLY
            //RANGE OF OPERATION FOR THRESHOLD IS 0.65-0.8.
        }
    FOREACH SUBBAND s
        FOR k=1:K
            WATERMARK(s,k)=Y of STATE(Y) - get the bit
corresponding to the state
            CHANGE_STATE(STATE(Y)) - change the state pseudo-
randomly
        ENDFOR
    ENDFOREACH
}
==========================================================================
            Example Two: Pseudorandom-Chessboarding using a Look-up Table --------------------------------------------------------------------------
CREATE_CHESS_WATERMARK (SECRET_KEY) {
    // TWO POSSIBLE WATERMARKS FOR TWO BIT LONG WATERMARK SEQUENCE
    LOOKUP_TABLE2X2 [2] [2] = { 1, 0,
                                        0, 1};
    // SIX POSSIBLE WATERMARKS FOR FOUR BITS LONG WATERMARK SEQUENCE
    LOOKUP_TABLE6X4 [6] [4] = {      1, 1, 0, 0,
                                     1, 0, 1, 0,
                                     1, 0, 0, 1,
                                     0, 0, 1, 1,
                                     0, 1, 0, 1,
                                     0, 1, 1, 0};
    // CREATION OF WATERMARK TABLES OF LENGHT 6 AND 8 BITS
    // BOTH TABLES ARE CREATED AS A SET OF ALL POSSIBLE
    // CONCATENATIONS OF LOWER ORDER TABLES
    for (i = 0; i < 6; i++)
        for (j = 0; j < 6; j++)
            for (k = 0; k < 8; k++)
                if (k < 4) LOOKUP_TABLE36x8[i*6+j] [k] =
LOOKUP_TABLE6X4 [i] [k];
                else LOOKUP_TABLE36x8[i*6+j] [k] =
LOOKUP_TABLE6X4 [j] [k-4];
    for (i = 0; i < 6; i++)
        for (j =0; j < 2; j++)
            for (k =0; k < 6; k++)
                if (k < 4) LOOKUP_TABLE12X6[i*2+j] [k] =
LOOKUP_TABLE6X4 [i] [k];
                else LOOKUP_TABLE12X6[i*2+j] [k] =
LOOKUP_TABLE2X2 [j] [k-4];
    // A WATERMARK WATERMARK(S,K) OF LENGTH K={2,4,6,8} IN S SUBBANDS
    // IS CREATED IN THE FOLLOWING WAY:
    INITIATE PSEUDO_RANDOM_NUMBER_GENERATOR RANDOM with SECRET_KEY
    FOREACH SUBBAND s IN S
        WATERMARK(s,K) = LOOKUP_TABLE?XK[RANDOM( )] [ ]
    ENDFOREACH
}
==========================================================================
```

Methodological Implementation of Exemplary Chess Watermark Detecting

Figure 8:
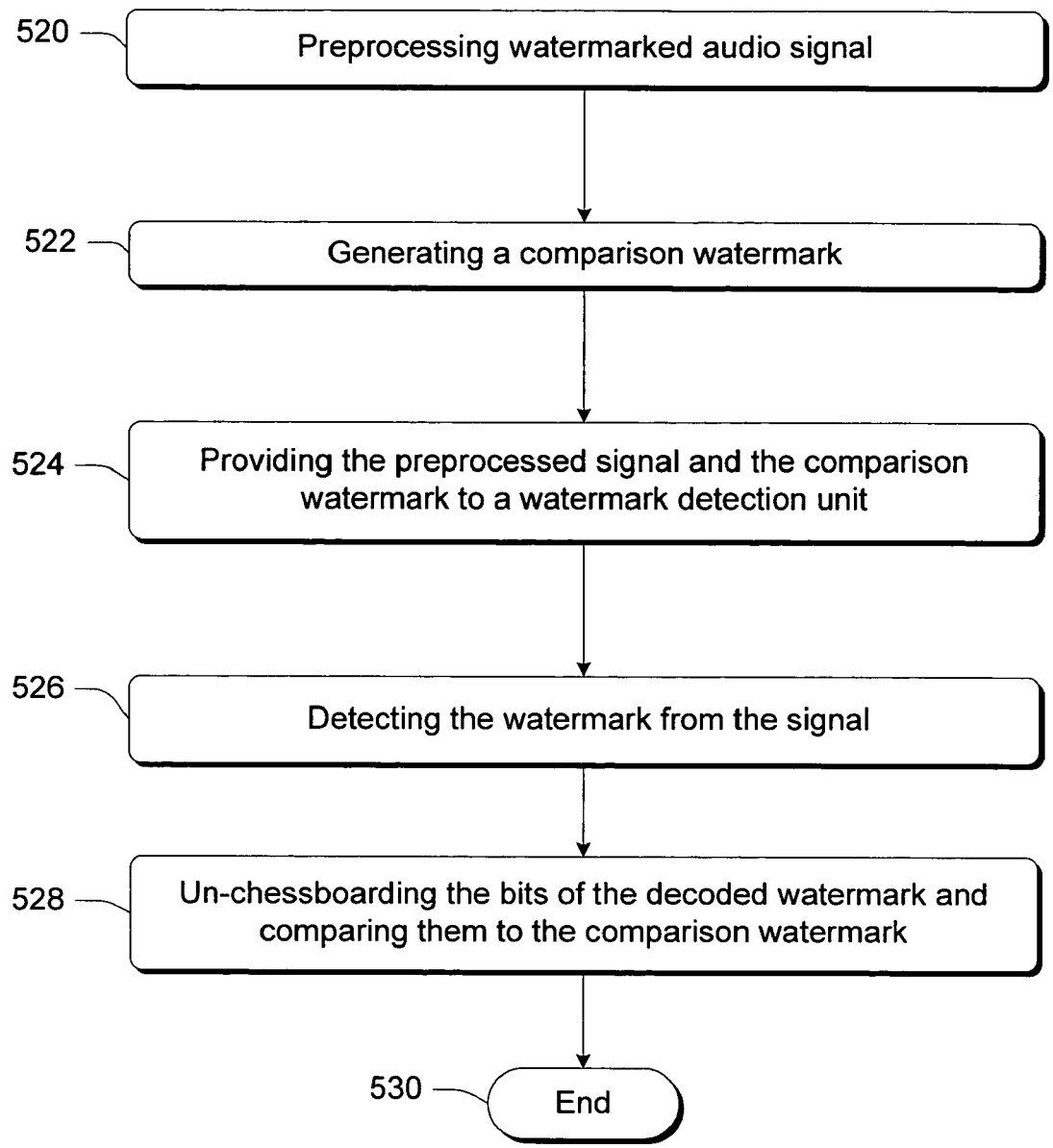
FIG. 8 is a flow diagram showing a methodological implementation of chess watermark decoding.

FIG. 8 shows a methodological implementation of the exemplary chess watermark detecting. At 520, a watermarked audio signal (such as from an audio clip) is preprocessed. The effective result of such preprocessing is to produce blocks and frames.

Furthermore, such signal preprocessing is generally described above in reference to the watermark detecting system of FIG. 3. It is also described in more detail in co-pending patent application: U.S. patent application Ser. No. 09/316,899, entitled "Audio Watermarking with Dual Watermarks" filed on May 22, 1999.

At 522, the watermark detector generates a comparison watermark in accordance with watermark generation described above and in the "Audio Watermarking with Dual Watermarks" co-pending application. This comparison watermark is generated using the same key as the original watermark. Therefore, they are identical.

At 524, the blocks of the audio signal and the comparison watermark are provided to a watermark detector unit (such as unit 146 in FIG. 3). At 526, the watermark is detected from the audio signal.

At 528 in FIG. 8, the detected watermark is "un-chessboarded." This means that the same technique used to generate the chessboard pattern is used to return the bits of the watermark back to their original pattern.

For example, a PRNG (such as PRNG 150 in FIG. 3) generates pseudorandom number to determine whether to switch a bit. It uses the same engine as the PRNG of the encoder. It also uses the same key as the PRNG of the encoder; therefore, the resulting pseudorandom pattern is the same.

At 530, this process ends. Typically, the detector will generate a result-that indicates whether a watermark is present in the audio signal.

Energy-Level Triggering

As mentioned previously, the inserting of a bit value (one or zero) of the watermark involves slight modification of frequency magnitudes in the frequency domain of a block. That slight modification is an addition or subtraction of typically one dB. Since dBs are on a logarithmic scale, this modification is difficult to detect. That is, unless there is a large discrepancy (e.g. a factor of three or more) in the energy levels across the time blocks in which the bit is being written.

Because changes in the magnitude frequency components tend to spread in time, a change that is small with respect to a large energy portion of a block may be large with respect to a small energy portion. That could make the change detectable and help a pirate in a malicious attack attempt. Also, it could lead to audible distortions.

Figure 9:
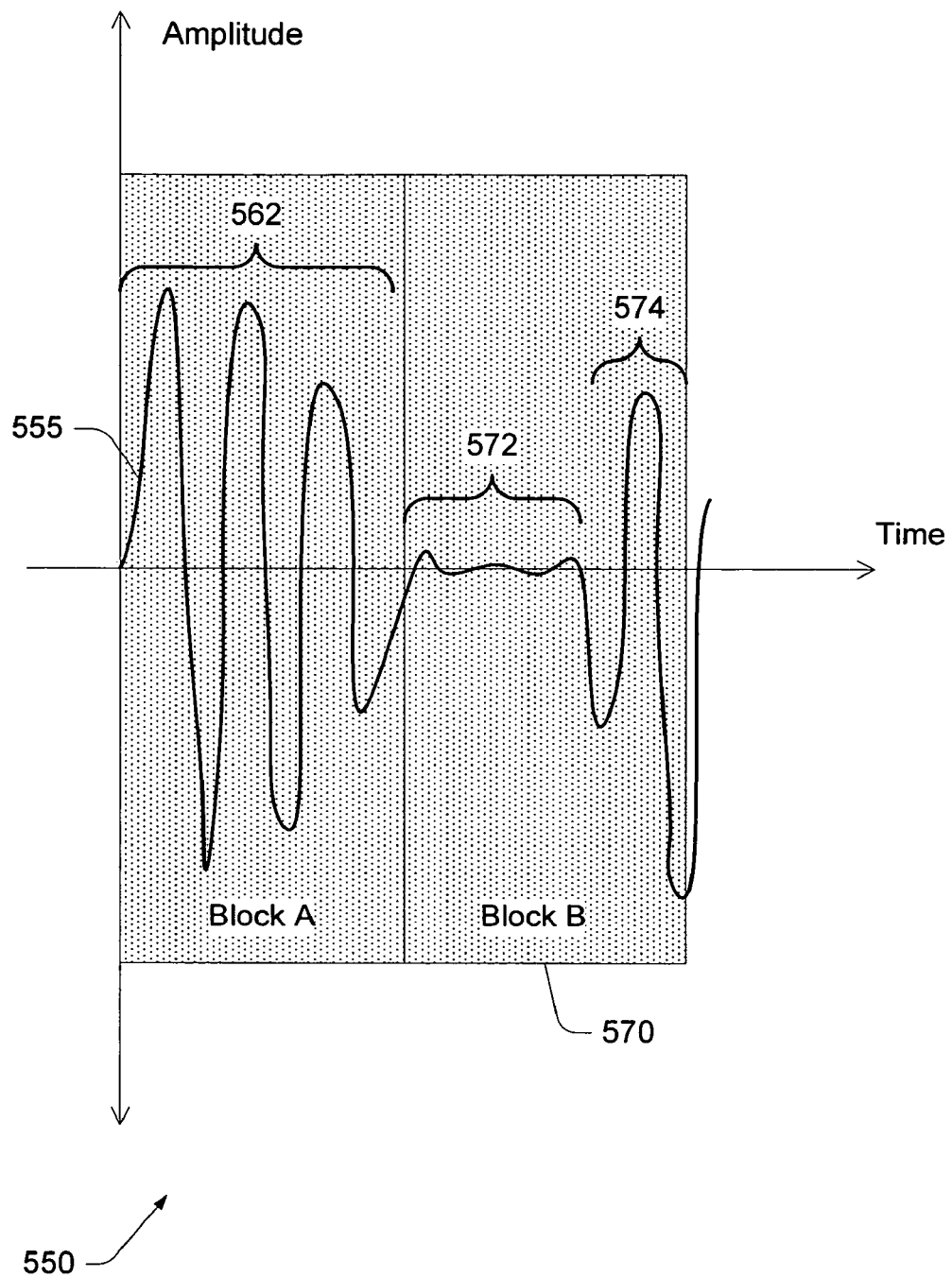
FIG. 9 shows a plot of a portion of an audio signal to illustrate a large discrepancy of energy level in a block.

FIG. 9 shows a graph 550 of partial signal 555 and illustrates this issue. Time advances from left to right on the graph 550. Up and down illustrates the amplitude (i.e., magnitude, energy level) of the signal 555.

Figure 10:
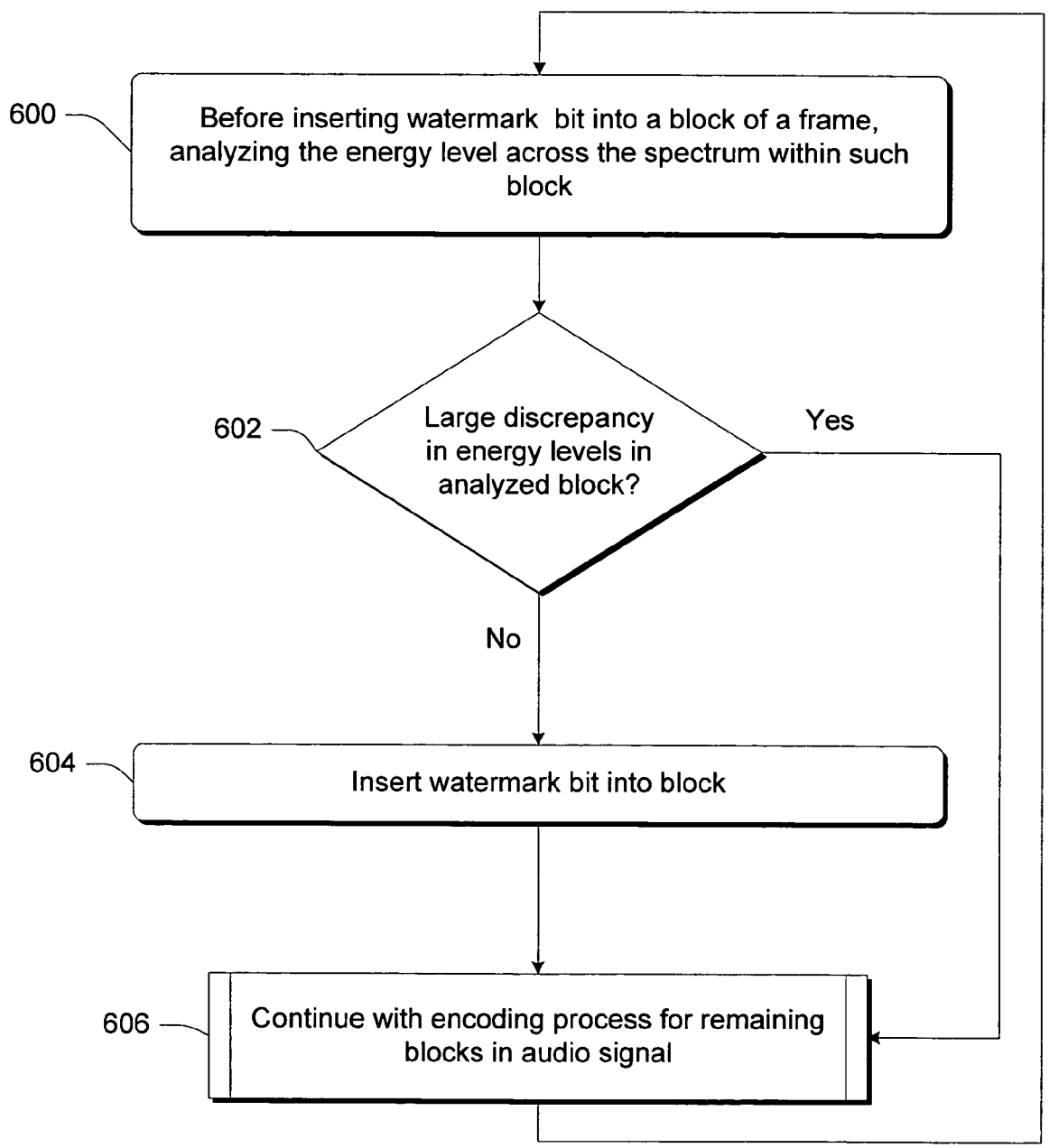
FIG. 10 is a flow diagram showing a methodological implementation of improved stealthy audio watermarking with energy-level triggering.

Methodological Implementation of Exemplary Watermark Encoding with Energy-Level Triggering FIG. 10 shows a methodological implementation of the exemplary watermark encoding with energy-level triggering. At 600, before inserting a bit of a watermark into a block of a frame, the encoder (such as the one shown in FIG. 2) analyzes the energy level across the spectrum within such block.

At 602, the encoder determines if there is a large discrepancy in energy levels of the analyzed block. If not, a watermark bit is inserted into the block at 604. After that, the process continues at block 606. At 606, the normal encoding process continues for remaining blocks in audio signal. If there is a large discrepancy in energy levels, then that block is skipped and the process jumps to block 606.

The following is an example of pseudocode that may be used to implement exemplary watermark encoding with energy-level triggering:

---

Example: Watermark Encoding using Energy-Level Triggering

---

ROUTINE TO_WATERMARK WHICH CHECKS for pre-echo PROBLEMS

---

INPUT=BLOCK OF FREQUENCY MAGNITUDES {BLOCK}
OUTPUT=DECISION TO WATERMARK

---

```
{YES,NO} = TO_WATERMARK(BLOCK) {
    SCALE = #(FREQUENCY MAGNITUDES PER FREQUENCY SPECTRUM BLOCK) /
#(SUBBAND PARTITIONS)
    max_energy = 0
    min_energy = LARGEST_POSSIBLE_NUMBER
    FOREACH SUBBAND PARTITION sp {
        ENERGY = COMPUTE NORMALIZED SUM OF ENERGY OF ALL FREQUENCY
MAGNITUDES IN SUBBAND sp
            if (ENERGY > max_energy) max_energy = ENERGY
            if (ENERGY < min_energy) min_energy = ENERGY
    }
    if (max_energy/min_energy < ERLIM) return(YES); else return(NO)
}
ERLIM is established empirically and for example for 8 subbands,
ERLIM is used in the range of 100 and 200.
```
===========================================================

---

A fragment 562 of such signal 555 is shown in Block A 560. The energy level across the frequency spectrum in that fragmented signal 562 is roughly similar.

Compare that to fragments 572 and 574 of signal 555 as shown in Block B 570. The energy level of fragmented signal 572 is dramatically different from that of fragmented signal 574. Fragmented signal 572 has a very low energy level, but fragmented signal 574 has a very high energy level.

In the exemplary watermark encoder using an energy-level trigger, the encoder detects blocks having a large discrepancy in energy level and skips them-, i.e., it simply does not insert the watermark in that block.

The detector need not know that the encoder skipped a block. It does not matter if a few watermarks were not encoded because of energy-level triggering. There are plenty of other watermarked blocks in the audio clip to ensure correct operation of the correlation-based detector (as described in more detail in co-pending patent application: U.S. patent application Ser. No. 09/316,899, entitled "Audio Watermarking with Dual Watermarks" filed on May 22, 1999).

Variable Starting Position of Watermark

Averaging Attacks. An averaging attack is another form of malevolent attack. Typically, a music publisher often uses the same key to generate their watermark in each published audio clip. This key is designed to identify the publisher.

If a digital audio rustler processes a collection of audio clips that were encoded using a common key, then the rustler may "average" out all of the music (which is effectively noise) to find a commonly encoded watermark in each clip. Once this watermark is found, it can be removed or changed.

Variable Starting Position. An averaging attack may be thwarted by varying the starting point to initiate encoding of the watermark. Since the watermarks in each of a collection of common-key clips are time shifted relative each other, averaging them provides no useful information.

Figure 11:
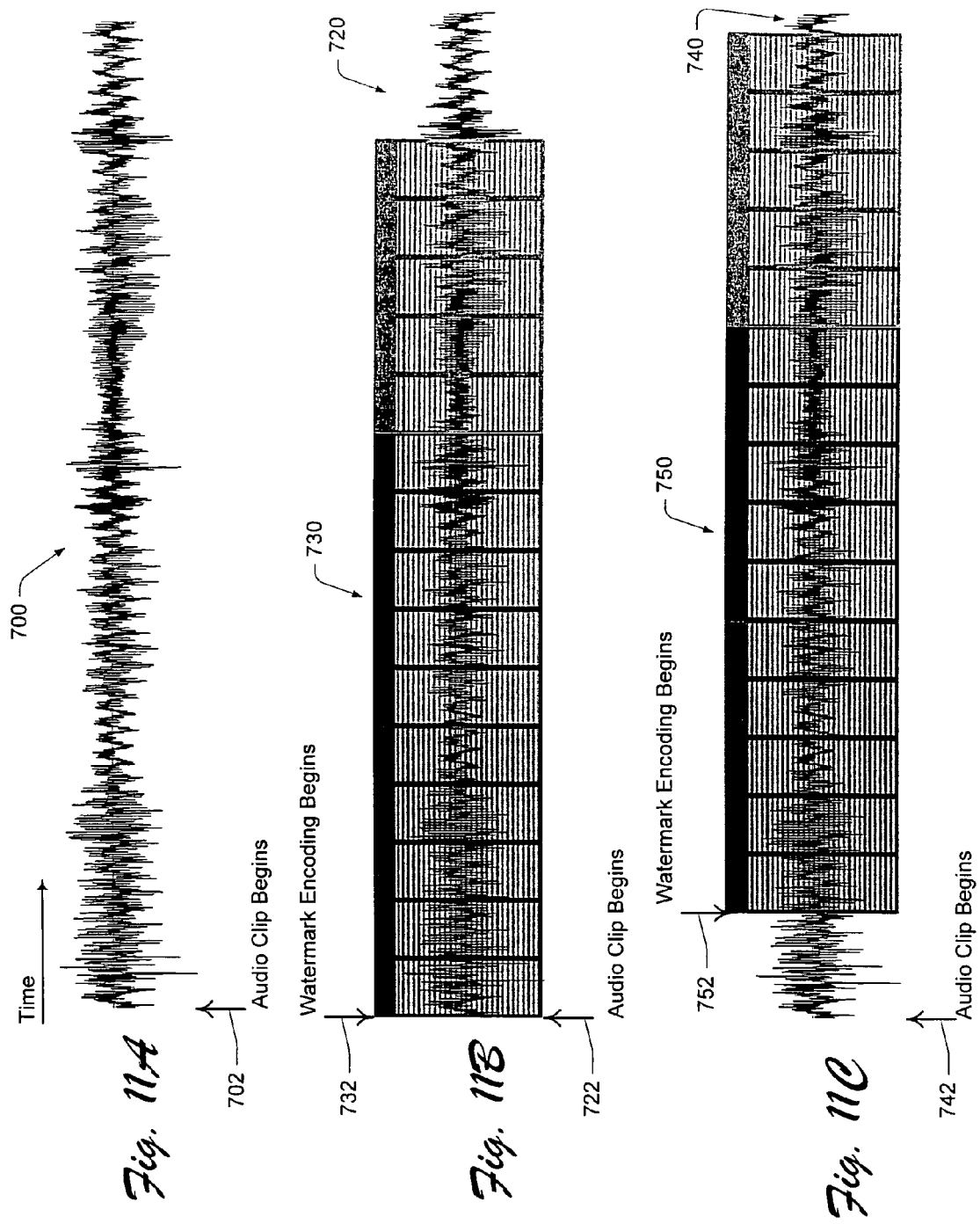
FIGS. 11A-11C show graphs of an audio clip to-illustrate variable starting positioning for watermark encoding.

FIGS. 11A-C illustrate this variable-starting-position encoding. FIG. 11A shows a time graph 700 of an audio clip. The clip starts at the point indicated by arrow 702.

FIG. 11B shows a graph 720 of the same audio clip of FIG. 11A. The clip starts at the point indicated by arrow 722. FIG. 11B also includes a representation of a simplified watermark at 730. The beginning of the encoded watermark begins at the point indicated by arrow 732. Like what is shown in FIG. 11B, the beginning 732 of watermark encoding conventionally coincides with the is beginning 722 of the audio clip.

FIG. 11C illustrates a graph 740 of the same audio clip of FIGS. 11A and 11B. The clip starts at the point indicated by arrow 742. FIG. 11C also includes a representation of a simplified watermark at 750. The beginning of the encoded watermark begins at the point indicated by arrow 752. Unlike conventional approaches, the beginning 752 of watermark encoding occurs after the beginning 742 of the audio clip.

How far after? In one example, a PRNG pseudorandomly selects an amount of time after the beginning of the clip to begin encoding the watermark. This may use a PRNG like that used for the exemplary chess watermark encoding. If the PRNG uses the same key when the audio clip is being detected, then detecting will begin at the correct moment in the clip.

Figure 12:
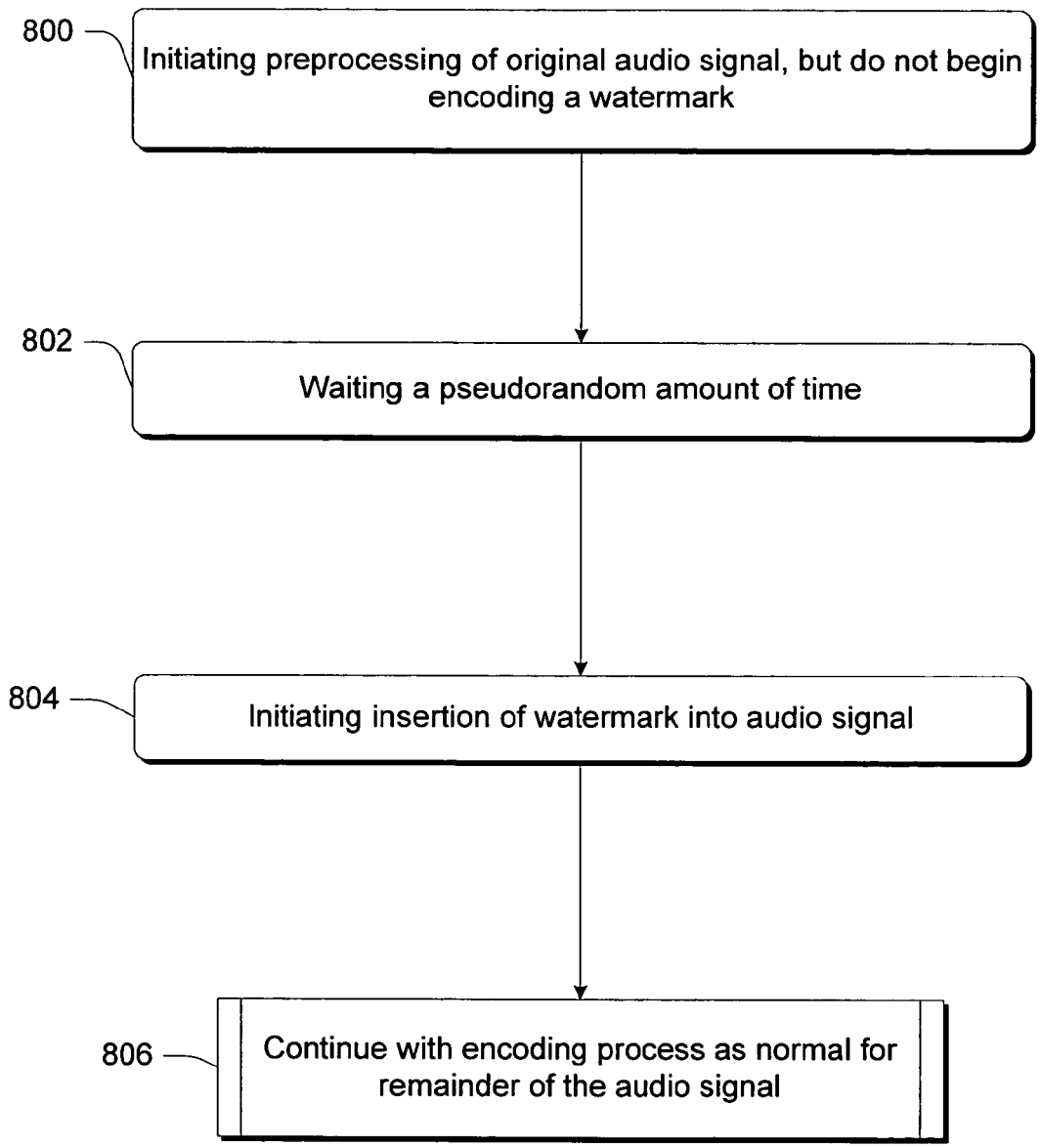
FIG. 12 is a flow diagram showing a methodological implementation of improved stealthy audio watermarking with variable starting position.

Methodological Implementation of Exemplary Watermarking with Variable Starting Position FIG. 12 shows a methodological implementation of the exemplary watermark encoding with variable starting position. At 800, the detector initiates preprocessing of an original audio signal. However, watermark encoding does not yet begin.

Such signal preprocessing is generally described above in reference to the watermark encoding system of FIG. 2. It is also described in more detail in co-pending patent application: U.S. patent application Ser. No. 09/316,899, entitled "Audio Watermarking with Dual Watermarks" filed on May 22, 1999.

At 802, the encoder waits for a pseudorandom amount of time. This period of time may be determined by a PRNG using a given key. The PRNG of the detector uses the same key; thus, it begins detecting at the correct moment in the clip.

At 804, the encoder initiates insertion of the watermark into the audio signal. At 806, the normal encoding process continues for the remainder of the audio signal.

Exemplary Computing Environment

FIG. 13 illustrates an example of a suitable computing environment 920 on which the exemplary watermarking may be implemented.

Exemplary computing environment 920 is only one example of a suitable computing environment and is not intended to suggest any limitation as to the scope of use or functionality of the exemplary watermarking. Neither should the computing environment 920 be interpreted as having any dependency or requirement relating to any one or combination of components illustrated in the exemplary computing environment 920.

The exemplary watermarking is operational with numerous other general purpose or special purpose computing system environments or configurations. Examples of well known computing systems, environments, and/or configurations that may be suitable for use with the exemplary watermarking include, but are not limited to, personal computers, server computers, think clients, thick clients, handheld or laptop devices, multiprocessor systems, microprocessor-based systems, set top boxes, programmable consumer electronics, network PCs, minicomputers, mainframe computers, distributed computing environments that include any of the above systems or devices, and the like.

The exemplary watermarking may be described in the general context of computer-executable instructions, such as program modules, being executed by a computer. Generally, program modules include routines, programs, objects, components, data structures, etc. that perform particular tasks or implement particular abstract data types. The exemplary watermarking may also be practiced in distributed computing environments where tasks are performed by remote processing devices that are linked through a communications network. In a distributed computing environment, program modules may be located in both local and remote computer storage media including memory storage devices.

As shown in FIG. 13, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 930 typically includes a variety of computer readable media. Such media may be any available media that is accessible by computer 930, and it includes both volatile and non-volatile media, removable and non-removable media.

In FIG. 13, the system memory includes computer readable media in the form of volatile, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 13 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 13 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 13, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 13 illustrates remote application programs 989 as residing on a memory device of remote computer 982. It will be appreciated that the network connections shown and described are exemplary and other means of establishing a communications link between the computers may be used.

Exemplary Operating Environment

FIG. 13 illustrates an example of a suitable operating environment 920 in which the exemplary watermarking may be implemented. Specifically, the exemplary watermarking is implemented by any program 960-962 or operating system 958 in FIG. 13.

The operating environment is only an example of a suitable operating environment and is not intended to suggest any limitation as to the scope of use of functionality of the exemplary watermarking described herein. Other well known computing systems, environments, and/or configurations that may be suitable for use with the exemplary watermarking include, but are not limited to, personal computers, server computers, hand-held or laptop devices, multiprocessor systems, microprocessor-based systems, programmable consumer electronics, wireless communications equipment, network PCs, minicomputers, miainframe computers, distributed computing environments that include any of the above systems or devices, and the like.

Computer-Executable Instructions

An implementation of the exemplary watermarking may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary watermarking may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the improved stealthy audio watermarking has been described in language specific to structural features and/or methodological steps, it is to be understood that the improved stealthy audio watermarking defined in the appended claims is not necessarily limited to the specific features or steps described. Rather, the specific features and steps are disclosed as preferred forms of implementing the claimed improved stealthy audio watermarking.

The invention claimed is:

1. A method for encoding values within a digital audio signal, the method comprising:
   receiving the digital audio signal having frequency magnitude components;
   analyzing the relative energy levels of the frequency magnitude components of the signal;
   determining whether the signal has a large discrepancy in the relative energy levels of the frequency magnitude components, wherein the large discrepancy is a discrepancy of a factor of three or more;

encoding at least one bit of the digital watermark into the digital signal based on the determination.

2. A method as recited in claim 1 further comprising if the signal has no large discrepancy in the relative energy levels of the frequency magnitude components, then encoding at least one value into the signal.

3. A method as recited in claim 1 further comprising if the signal has a large discrepancy in the relative energy levels of the frequency magnitude components, then skipping encoding values into the signal.

4. A computer-readable storage medium having computer-executable instructions that, when executed by a computer, perform a method for encoding values within a digital audio signal, the method comprising;

receiving the digital audio signal having frequency magnitude components;

analyzing the relative energy levels of the frequency magnitude components of the signal;

determining whether the signal has a large discrepancy in the relative energy levels of the frequency magnitude components, wherein the large discrepancy is a discreoancy of a factor of three or more;

encoding at least one bit of the digital watermark into the digital signal based on the determination.

5. A watermark encoding system for encoding bits of a digital watermark within a digital audio signal having frequency magnitude components, the system comprising:

an analyzer to examine the relative energy levels of the frequency magnitude components of the signal and determine whether the signal has a large discrepancy in the relative energy levels of the frequency magnitude components, wherein the large discrepancy is a discrepancy of factor of three or more;

an encoder coupled to the analyzer, the encoder is configured to insert at least one bit of the digital watermark into the digital signal.

6. A system as recited in claim 5, wherein the encoder inserts at least one bit of the digital watermark into the digital signal if the analyzer determines that the signal has no large discrepancy in the relative energy levels of the frequency magnitude components.

7. A system as recited in claim 5, wherein the encoder does not insert a bit of the digital watermark into the digital signal if the analyzer determines that the signal has a large discrepancy in the relative energy levels of the frequency magnitude components.

* * * * *